(12) United States Patent
Froggatt et al.

(10) Patent No.: US 11,815,371 B2
(45) Date of Patent: Nov. 14, 2023

(54) OVERLAPPING FIBER GRATINGS

(71) Applicant: Intuitive Surgical Operations, Inc., Sunnyvale, CA (US)

(72) Inventors: Mark E. Froggatt, Blacksburg, VA (US); Brooks Childers, Christiansburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 17/877,526

(22) Filed: Jul. 29, 2022

(65) Prior Publication Data

US 2022/0373365 A1  Nov. 24, 2022

Related U.S. Application Data

(63) Continuation of application No. 15/734,936, filed as application No. PCT/US2019/035429 on Jun. 4, 2019, now Pat. No. 11,506,519.

(60) Provisional application No. 62/680,217, filed on Jun. 4, 2018.

(51) Int. Cl.
*G01D 5/353* (2006.01)
*G02B 6/02* (2006.01)

(52) U.S. Cl.
CPC ..... *G01D 5/35316* (2013.01); *G02B 6/02085* (2013.01)

(58) Field of Classification Search
CPC ............ G01D 5/35316; G02B 6/02085; G02B 6/02138
See application file for complete search history.

(56) References Cited

U.S. PATENT DOCUMENTS

| 5,627,927 A * | 5/1997 | Udd ................... G01D 5/35312 |
| | | 385/24 |
| 6,330,383 B1 | 12/2001 | Cai et al. |
| 9,772,176 B2 | 9/2017 | Froggatt et al. |
| 10,551,626 B2 * | 2/2020 | Marciante .............. G02B 27/30 |
| 2001/0021294 A1 | 9/2001 | Cai et al. |

(Continued)

FOREIGN PATENT DOCUMENTS

| CN | 1955640 A | 5/2007 |
| CN | 104852270 A | 8/2015 |

(Continued)

OTHER PUBLICATIONS

Extended European Search Report for Application No. EP19814198.8 dated Mar. 18, 2021, 08 pages.

(Continued)

*Primary Examiner* — Seung C Sohn
(74) *Attorney, Agent, or Firm* — Schwegman, Lundberg & Woessner, P.A.

(57) ABSTRACT

Described are optical fibers, e.g., for use in stress-sensing or shape-sensing applications, that use overlapping grating configurations with chirped gratings to facilitate strain delay registration. In accordance with various embodiments, a fiber core may, for instance, have two overlapping sets of chirped gratings that differ in the direction of the chirp between the first and second sets, or a set of chirped gratings overlapping with a single-frequency grating. Also described are strain sensing systems and associated computational methods employing optical fibers with overlapping gratings.

20 Claims, 14 Drawing Sheets

(56) References Cited

U.S. PATENT DOCUMENTS

| | | |
|---|---|---|
| 2003/0059165 A1 | 3/2003 | Belmonte et al. |
| 2005/0063430 A1 | 3/2005 | Doucet et al. |
| 2010/0303403 A1 | 12/2010 | Homa et al. |
| 2015/0029511 A1 | 1/2015 | 'T Hooft et al. |
| 2017/0363410 A1 | 12/2017 | Froggatt et al. |
| 2021/0231465 A1 | 7/2021 | Froggatt et al. |

FOREIGN PATENT DOCUMENTS

| | | |
|---|---|---|
| JP | 2005321601 A | 11/2005 |
| JP | 2015517091 A | 6/2015 |
| JP | 2015190917 A | 11/2015 |
| KR | 100785046-81 | 12/2007 |
| WO | WO-2013136247 A1 | 9/2013 |
| WO | WO-2016161245 A1 | 10/2016 |

OTHER PUBLICATIONS

International Search Report and Written Opinion for Application No. PCT/US2019/035429, dated Sep. 30, 2019, 13 pages.

Vertut, J, and Coiffet, P., "Robot Technology: Teleoperation and Robotics Evolution and Development," English translation, Prentice-Hail, Inc., Inglewood Cliffs, NJ, USA 1986, vol. 3A, 332 pages.

* cited by examiner

– continuation of and claims the benefit of priority under 35 U.S.C. § 120 to U.S. patent application Ser. No. 15/734,936, filed on Dec. 3, 2022, which is a U.S. National Stage Filing under 35 U.S.C. 371 from International Application No. PCT/US2019/035429, filed on Jun. 4, 2019, and published as WO 2019/236604 A1 on Dec. 12, 2019, which claims the benefit of priority to U.S. Provisional Patent Application Ser. No. 62/680,217, filed on Jun. 4, 2018, each of which is incorporated by reference herein in its entirety.

OVERLAPPING FIBER GRATINGS

CLAIM OF PRIORITY

This application is a continuation of and claims the benefit of priority under 35 U.S.C. § 120 to U.S. patent application Ser. No. 15/734,936, filed on Dec. 3, 2022, which is a U.S. National Stage Filing under 35 U.S.C. 371 from International Application No. PCT/US2019/035429, filed on Jun. 4, 2019, and published as WO 2019/236604 A1 on Dec. 12, 2019, which claims the benefit of priority to U.S. Provisional Patent Application Ser. No. 62/680,217, filed on Jun. 4, 2018, each of which is incorporated by reference herein in its entirety.

TECHNICAL FIELD

This disclosure relates generally to gratings inscribed in optical fiber cores, and more specifically to grating configurations for strain delay registration.

BACKGROUND

Optical fibers can be used as distributed optical sensors in many applications, for instance, to measure a physical parameter associated with the optical fiber, such as pressure, temperature, and the two-dimensional or three-dimensional shape of the fiber. Fiber-optic shape sensing is useful, for example, in industrial, recreational, medical, robotic, and other procedures where collocating a portion of a tool with a portion of a shape-sensing optical fiber facilitates determination of the location of the tool. As a further example, collocating a medical tool with a portion of a shape-sensing optical fiber can help facilitate more precise determination of the location of the tool in robotic and non-robotic medical procedures. As a specific medical example, in robotic or other computer-assisted surgery, collocating a surgical tool with a portion of the shape-sensing optical fiber facilitates precise determination of the location of the tool outside or within the patient's body based on the three-dimensional fiber shape. The fiber shape can be computed from the bend, twist, and axial strain along the optical fiber, which, in turn, are determined based on continuous strain measurements along multiple cores of the fiber. For accurate shape determinations, it is not only important to measure the strain accurately, but also to know where along the length of the fiber each strain measurement applies.

When an optical fiber is used as a sensor, the fiber is interrogated by sending light down the fiber and measuring reflections received from various locations along the fiber; the spectral characteristics of the reflected light can be processed to provide information about local fiber properties, such as local strain. Fiber interrogation can be accomplished, for instance, by optical frequency-domain reflectometry (OFDR), which uses a tunable laser scanned across a specified frequency range to provide the optical input signal. OFDR enables precise measurement of time-of-flight of the optical signal along the fiber. Core elongations of the fiber between two measurements can cause reflections from the same piece of optical fiber to appear at different time delays in the two measured signals, and dynamic changes in the fiber during a laser scan can even cause reflections from the same piece of optical fiber to appear at different time delays within a single measured signal. Accordingly, matching strain measurements to particular physical points of the optical fiber rather than to particular delays, herein referred to as strain delay registration, constitutes a challenging problem.

A previous approach to strain delay registration exploited Rayleigh scatter correlations. Rayleigh scattering off the random microscopic density variations intrinsic to an optical fiber has the property that it is delta-correlated (that is, the correlation signal exhibits a distinct maximum) in both the time domain and the spectral domain. This property allows a measured spectrum (corresponding to a temporal slice of a spectrogram computed from a measured time-domain reflection signal), via correlations against a set of reference spectra with known correspondence between time delay and physical location along the fiber, to be uniquely mapped to a particular reference spectrum and a particular frequency shift relative to the reference spectrum, and thus to a particular location along the fiber and a particular strain at that location. However, one problem associated with this approach is that random reflectors can entail locations along the fiber where the reflection signal is of very low amplitude. A second problem with Rayleigh scatter signals is that, at any point within the correlation signal that does not correspond to the correct reference spectrum and the correct frequency shift between the measured Rayleigh scatter spectrum and the reference spectrum, there will be no correlation maximum and no indication where or how far away the correlation maximum is. Accordingly, only a complete search of the time-delay and frequency-shift space can locate the correlation maximum.

Accordingly, an improved approach is desired.

SUMMARY

Described herein are optical fibers—for instance, for use in measuring physical parameters such as in stress-sensing, temperature-sensing, or shape-sensing applications—that use overlapping configurations of fiber Bragg gratings (FBGs), including chirped gratings, to facilitate strain delay registration while avoiding the drawbacks associated with Rayleigh scattering. FBGs are formed by at least locally periodic variations in the refractive index of the fiber core, and provide a strong reflection signal that allows for accurate strain measurements. Determining the location of the measured strain along the fiber, however, is generally difficult with FBGs having a uniform grating period, as the reference signal taken with such uniform gratings results in a constant frequency of the reflected signal across a range of time delays corresponding to the length of the grating. By contrast, in a chirped grating, the periodicity of the grating, and thus the frequency of the reflected signal, varies as a function of time delay, or position along the fiber. As a result, chirped gratings facilitate spatially resolving strain along the fiber.

While a chirped grating by itself renders strain-induced frequency shifts between reference and measurement signals indistinguishable from time-delay shifts undergone by a particular physical piece of the fiber (e.g., as a result of elongation), the combination of two overlapping sets of gratings (that is, gratings occupying a common fiber section) that are not chirped in the same manner can resolve this ambiguity. For example, a pair of counter-chirped gratings—one with increasing grating period in a given direction and the other one with decreasing grating periodic in the same direction—has reflection peaks, for a given time delay corresponding to a particular location along the fiber, at generally two frequencies. Strain at that location along the fiber causes the frequency of both peaks to shift in the same direction, while a time-delay shift for the location results in frequency shifts in opposite directions. As another example, a chirped grating may be combined with a single-frequency grating to provide two reflection peaks for a given location along the fiber. In this case, strain, again, results in the same frequency shift for both peaks, whereas a time-delay shift affects only the frequency peak of the chirped grating.

In a correlation signal obtained, for an optical fiber with overlapping gratings, by correlating a measurement spectrum at a given time delay with reference spectra across a range of time delays (or vice versa), the correlation maxima fall on different lines for the different respective gratings, with slopes of the lines differing between gratings with different chirps. The intersection of these lines, corresponding to a common correlation maximum, appears at the correct, disambiguated time delay and frequency shift. The common maximum can be determined by performing an exhaustive search over a range of time delays of the reference spectra that spans the maximum expected time-delay shift relative to the measurement spectrum. Alternatively, in accordance with various embodiments, the search space can be reduced by estimating the location of the common maximum based on extrapolation from correlation maxima across frequency at two or more discrete points in time delay. In this manner, the use of overlapping gratings not identical in chirp can substantially reduce the computational cost of finding the correlation maximum, e.g., as compared with Rayleigh-scattering-based techniques.

Accordingly, in a first aspect, this disclosure pertains to an optical fiber including a fiber core having overlapping first and second sets of gratings inscribed therein, and a cladding surrounding the fiber core. The first set of gratings includes one or more chirped gratings extending over a section of the fiber, and the second set of gratings includes one or more gratings extending over the section of the fiber that are not chirped like the one or more chirped gratings of the first set of gratings. The first set of gratings and the second set of gratings may each include a plurality of gratings that extend consecutively over the section of the fiber. The section may extend substantially along an entire length of the optical fiber. In some embodiment, the one or more gratings of the second set of gratings is a single-frequency grating. In other embodiments, the one or more gratings of the second set of gratings are chirped, in an opposite direction to the one or more chirped gratings of the first set of gratings. The one or more chirped gratings of the first set and the one or more chirped gratings of the second set may have a common grating length, and the one or more chirped gratings of the first set of gratings may be offset relative to the one or more gratings of the second set of gratings by half the common grating length. A chirp rate of the one or more chirped gratings of the first set of gratings may be equal in magnitude to a chirp rate of the one or more gratings of the second set of gratings. The optical fiber may additionally include a single-frequency grating, wherein the single-frequency grating and the one or more chirped gratings of the first set of gratings are consecutive gratings. The optical fiber may be a multicore fiber, that is, may include at least one additional fiber core. For each additional fiber core, the additional fiber core may likewise have inscribed therein two overlapping sets of gratings, wherein a first one of the two overlapping sets of gratings includes one or more chirped gratings extending over the section of the fiber, wherein a second one of the two overlapping sets of gratings includes one or more gratings extending over the section of the fiber, and wherein the one or more gratings of the second one of the two overlapping sets of gratings are not chirped like the one or more chirped gratings of the first one of the two overlapping sets of gratings.

In another aspect, this disclosure describes a method for measuring strain along an optical fiber that includes first and second sets of gratings inscribed in a fiber core of the optical fiber, wherein the first set of gratings overlaps with the second set of gratings, and wherein the first set of gratings includes one or more chirped gratings and the second set of gratings includes one or more gratings that are not chirped like the one or more gratings of the first set of gratings. The method includes interrogating the optical fiber in a reference state of the fiber (e.g., an unstrained state) to obtain first time-delay-dependent reflection spectra resulting from combined reflections off the first and second sets of gratings, wherein each time delay of the first time-delay-dependent reflection spectra corresponds to an associated position of a plurality of positions along the fiber. The method further includes interrogating the optical fiber in a strained state of the fiber to obtain second time-delay-dependent reflection spectra resulting from combined reflections off the first and second sets of gratings, and then correlating the first time-delay-dependent reflection spectra with the second time-delay-dependent reflection spectra to determine correlation maxima across time delay and frequency, each correlation maximum corresponding to a pair of a spectrum of the first time-delay dependent reflection spectra and a spectrum of the second time-delay-dependent reflection spectra, and to a frequency shift between the first and second time-delay-dependent spectra of the pair. For each of the correlation maxima, a strain at a position along the fiber associated with the first time-delay-dependent reflection spectrum of the pair is then computed from the frequency shift associated with the correlation maximum.

To correlate the first time-delay-dependent reflection spectra with the second time-delay-dependent reflection spectra, the method may involve correlating, for each of the plurality of positions along the fiber, an associated one of the first time-delay-dependent reflection spectra with each of a plurality of the second time-delay-dependent reflection spectra to determine a correlation maximum across time delays of the second time-delay-dependent reflection spectra and across frequency for that position along the fiber. Alternatively, the method may involve correlating, for each of the second time-delay-dependent reflection spectra, that second time-delay-dependent spectrum with each of a plurality of first time-delay-dependent reflection spectra to determine a correlation maximum across time delays of the first time-delay-dependent spectra and across frequency. The time delays associated with the plurality of second time-delay-dependent reflection spectra in the first case (or the plurality of first time-delay dependent reflection spectra in the second case) may cover, at a specified resolution, a range of time delays up to an expected maximum time-delay shift, the range of time delays surrounding the time delay associated with the respective one of the first (or second) time-delay-dependent reflection spectra. Alternatively, the correlation maxima across time delay and frequency may each be determined by a search performed near an estimated location of the respective correlation maximum, the estimated location being obtained by extrapolation from pairs of correlation maxima across frequency, each pair determined for a respective one of the plurality of the second time-delay-dependent reflection spectra in the first case (or the plurality of first time-delay-dependent spectra in the second case) and including a correlation maximum across frequency that is associated with the first set of gratings and a correlation maximum across frequency that is associated with the second set of gratings.

A further aspect pertains to a non-transitory machine-readable medium storing instructions, for execution by one or more hardware processors, that cause the processor(s) to perform the computational operations of the above-described method. In some embodiments, the instructions cause the hardware processor(s) to perform operations to determine strain along an optical fiber by efficiently processing time-delay-dependent reflection spectra measured with the optical fiber. The optical fiber includes a fiber core having first and second sets of gratings inscribed therein, wherein the first set of gratings overlaps with the second set of gratings, and wherein the first set of gratings includes one or more chirped gratings extending over a section of the fiber and the second set of gratings includes one or more gratings extending over the section of the fiber, the one or more gratings of the second set of gratings not being chirped like the one or more chirped gratings of the first set of gratings.

The operations include, for each measured time-delay-dependent reflection spectrum of the measured time-delay-dependent reflection spectra, correlating the respective measured time-delay-dependent reflection spectrum with a plurality of the time-delay-dependent reference reflection spectra to determine, for each of at least two of the plurality of time-delay-dependent reference reflection spectra, a pair of correlation maxima across frequency, the pair of correlation maxima including a correlation maximum across frequency associated with the first set of gratings and a correlation maximum across frequency associated with the second set of gratings. Further, the operations include extrapolating from the pairs of correlation maxima across frequency to determine an estimated location of a correlation maximum across time delay and frequency associated with the measured time-delay-dependent reflection spectrum; and then determining the correlation maximum across time delay and frequency by a search over correlations of the measured time-delay-dependent reflection spectrum with time-delay-dependent reference reflection spectra near the estimated location. The operations also include computing the strain at a position along the fiber associated with a time-delay-dependent reference reflection spectrum at that correlation maximum from a frequency shift associated with the correlation maximum.

In yet another aspect, a strain measurement system is described. The system includes an optical fiber as described above (i.e., a fiber with a core having overlapping first and second sets of gratings inscribed therein, wherein the first set of gratings includes one or more chirped gratings and the second set of gratings includes one or more gratings not chirped like those of the first set), a swept-wavelength interferometer system coupled to the fiber core and configured to measure reflection signals resulting from combined reflections off the first and second sets of gratings, and a computational processing unit. The swept-wavelength interferometer system may include a tunable laser. The computational processing unit is configured to convert the measured reflection signals to time-delay-dependent reflection spectra, correlate the time-delay-dependent reflection spectra with time-delay-dependent reference reflection spectra to determine correlation maxima across time delay and frequency (each correlation maximum corresponding to a pair of a spectrum of the time-delay dependent reflection spectra and a spectrum of the time-delay-dependent reference reflection spectra, and to a frequency shift between the time-delay-dependent reflection spectrum and the time-delay-dependent reference reflection spectrum of the pair), and compute, for each of the correlation maxima, a strain at a position along the fiber associated with time-delay-dependent reference reflection spectrum corresponding to the correlation maximum from an associated frequency shift.

The optical fiber may include one or more additional fiber cores, each likewise having two overlapping sets of gratings (as described above) inscribed therein. In some embodiments, the cores of the optical fiber include a central fiber core and at least three peripheral fiber cores helically wound around the central fiber core. Using measurements with these four cores, the computational processing unit may compute, for each of a plurality of positions along the fiber, from the associated frequency shifts determined for the fiber cores, an axial strain, a bend strain, and a twist strain. The first and second sets of gratings may extend substantially along an entire length of the optical fiber, and the computational processing unit may be further configured to compute a three-dimensional shape of the optical fiber from the axial strain, bend strain, and twist strain computed for the position along the optical fiber.

In some embodiments, the second set of gratings is a single-frequency grating. In other embodiments, the grating(s) of the second set of gratings are chirped in an opposite direction to the chirped grating(s) of the first set of gratings. In this case, the gratings of the first and second sets may have a common grating length, and their chirp rates may be equal in magnitude. Further, the fiber core may also include a single-frequency grating consecutive with the first and second sets of gratings. The system may further include a catheter, and the single-frequency grating may be located near a tip of the catheter.

BRIEF DESCRIPTION OF THE DRAWINGS

The foregoing will be more readily understood from the following description of various example embodiments, in particular, when taken in conjunction with the accompanying drawings.

DETAILED DESCRIPTION

Figure 1A:
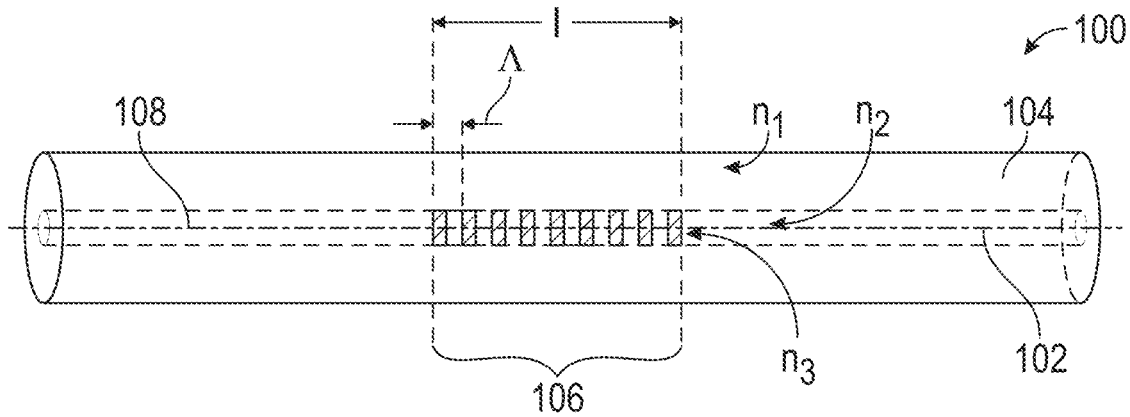
FIG. 1A is a schematic drawing of an example optical fiber with a uniform fiber grating inscribed therein in accordance with various embodiments.

The present disclosure relates generally to optical fibers with fiber gratings and to associated fiber-optic sensing systems and methods. FIG. 1A schematically illustrates an example single-core optical fiber 100 with a single uniform fiber grating inscribed therein. As shown, the optical fiber 100 includes a fiber core 102 surrounded by a cladding 104. The fiber 100 may be made of silica, with a dopant, such as germanium, added to the core 102 to increase the refractive index $n_2$ of the core 102 relative to the refractive index $n_1$ of the cladding 104, causing light to be guided in the core 102 by total internal reflection at the interface between core 102 and cladding 104. Optionally, the cladding 104 may be surrounded by a fiber coating (not shown).

Germanium-doped fiber cores (among others) are photosensitive, allowing the refractive index to be changed by exposure to ultraviolet (UV) light. This property can be used to create a grating 106 in the core 102 by periodically varying the refractive index along the longitudinal axis 108 of the fiber, e.g., between $n_2$ and a different refractive index $n_3$. The grating 106 may span a certain length 1, as shown, or extend along the entire length of the fiber. The grating period $\Lambda$, that is, the distance between two adjacent refractive-index maxima, determines the peak wavelength $\lambda_B$ and frequency $f_B$ (called the "Bragg wavelength" and "Bragg frequency," respectively) at which the grating 106 reflects light: $\lambda_B = 2n_e\Lambda$ and $f_B = c/\lambda_B$, where $n_e$ is the effective refractive index of the fiber core 102 and c is the speed of light. In accordance with various embodiments, gratings with Bragg wavelengths in the vicinity of 1550 nm are used.

Figure 1B:
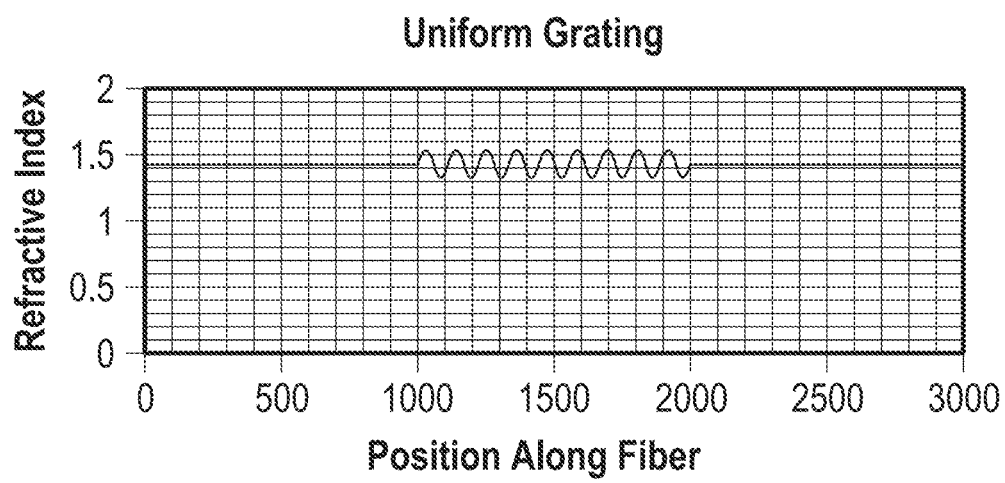
FIG. 1B is a plot of the refractive-index profile of the fiber grating of FIG. 1A.

FIG. 1A schematically depicts the refractive index in the grating 106 as varying between two discrete values, in accordance with a square wave function. In practice, the refractive-index profile of a grating is usually more akin to a sinusoidal, as shown by the example refractive index profile of FIG. 1B (plotted as a function of position along the fiber). A uniform fiber grating as illustrated in FIGS. 1A and 1B, that is, a grating with a constant grating period, exhibits a narrow reflection peak at the Bragg frequency and at a particular time delay that depends on the location of the grating along the fiber.

Figure 2A:
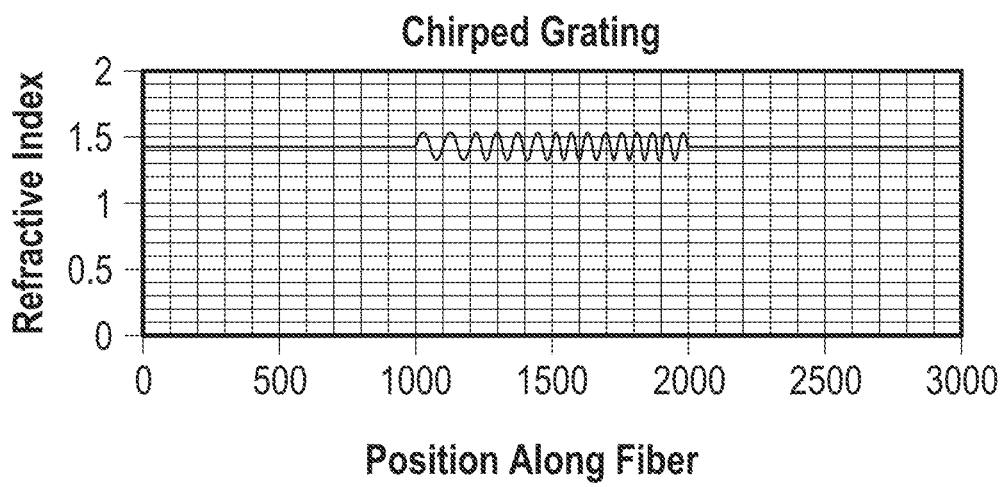
FIG. 2A is a plot of the refractive-index profile of a chirped fiber grating in accordance with various embodiments.
Figure 2B:
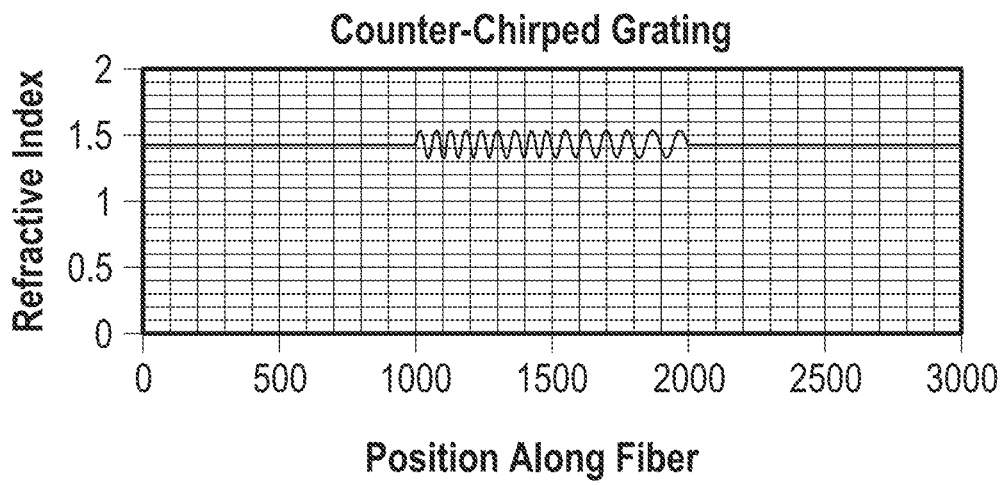
FIG. 2B is a plot of the refractive-index profile of a grating counter-chirped to that of FIG. 4A in accordance with various embodiments.
Figure 2C:
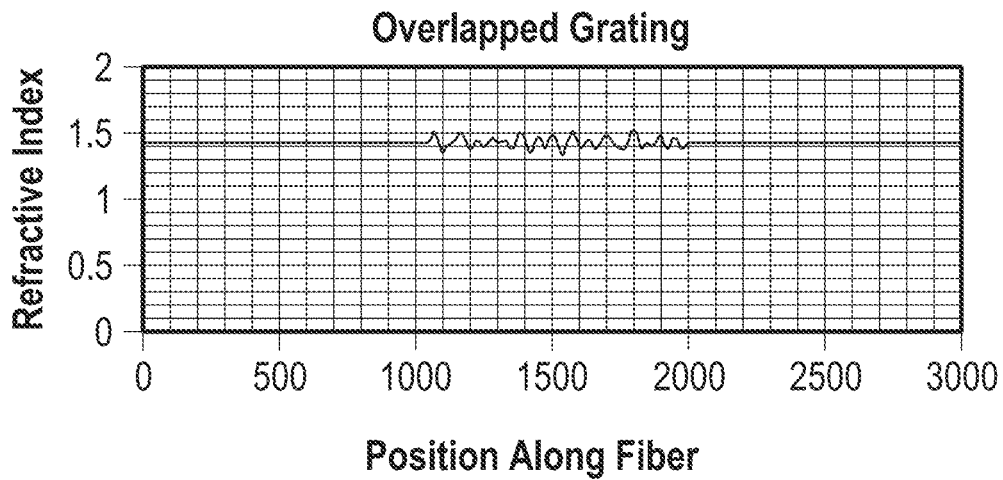
FIG. 2C is a plot of the refractive-index profile resulting from superposition of multiple refractive-index profiles in accordance with various embodiments.

With reference now to FIGS. 2A-2C, refractive index profiles of chirped fiber gratings as used in accordance with various embodiments are shown. In a chirped grating, the grating period $\Lambda$ varies as a function of position along the axis of the fiber. As a consequence of the change in the grating period $\Lambda$, the Bragg wavelength $\lambda_B$ and frequency $f_B$ likewise change along the axis of the fiber, resulting in a broader reflected spectrum and a time-dependent reflection signal that changes in frequency, e.g., as shown below in FIG. 6A. In FIG. 2A, the grating period $\Lambda$ decreases monotonically towards the right. FIG. 2B shows a refractive-index profile that is counter-chirped to that of FIG. 2A. That is, while the grating period in FIG. 2A decreases (and the Bragg frequency, accordingly, increases) towards the right, the grating period in FIG. 2B increases (and the Bragg frequency, accordingly, decreases). In accordance with various embodiments, counter-chirped gratings are written into an optical fiber core in an overlapping manner. To illustrate, FIG. 2C shows the refractive-index profile resulting from superposition of multiple counter-chirped refractive-index profiles.

Various well-known techniques are available to inscribe fiber gratings into a fiber core. Uniform gratings can be created efficiently by two-beam interference, where a UV laser beam is split into two beams that interfere, at the location of the fiber, to create a periodic intensity distribution along the interference pattern. Since the amount of the refractive-index change depends on the intensity of the light (in addition to the duration of exposure), this intensity distribution results in a periodic refractive-index change corresponding to the interference pattern. To create a non-uniform grating, a short interference pattern may be varied as the optical fiber is translated along the pattern, resulting, effectively, in a sequence of small, partially overlapping gratings. Alternatively, an appropriate diffraction grating (such as a fused silica transmission grating, typically called a phase mask) may be placed between the UV light source and the fiber. The phase mask conveniently creates a two-beam interference pattern at the location of the fiber using the +1 and −1 diffraction orders. Yet another option is to write the grating into the fiber core point-by-point, using a tightly focused laser beam, the points spaced at the desired grating period. This method allows writing different gratings into different cores of a multicore fiber. By contrast, using two-beam interference or phase masks, the same type of grating is written simultaneously into all cores of the fiber.

Figure 3A:
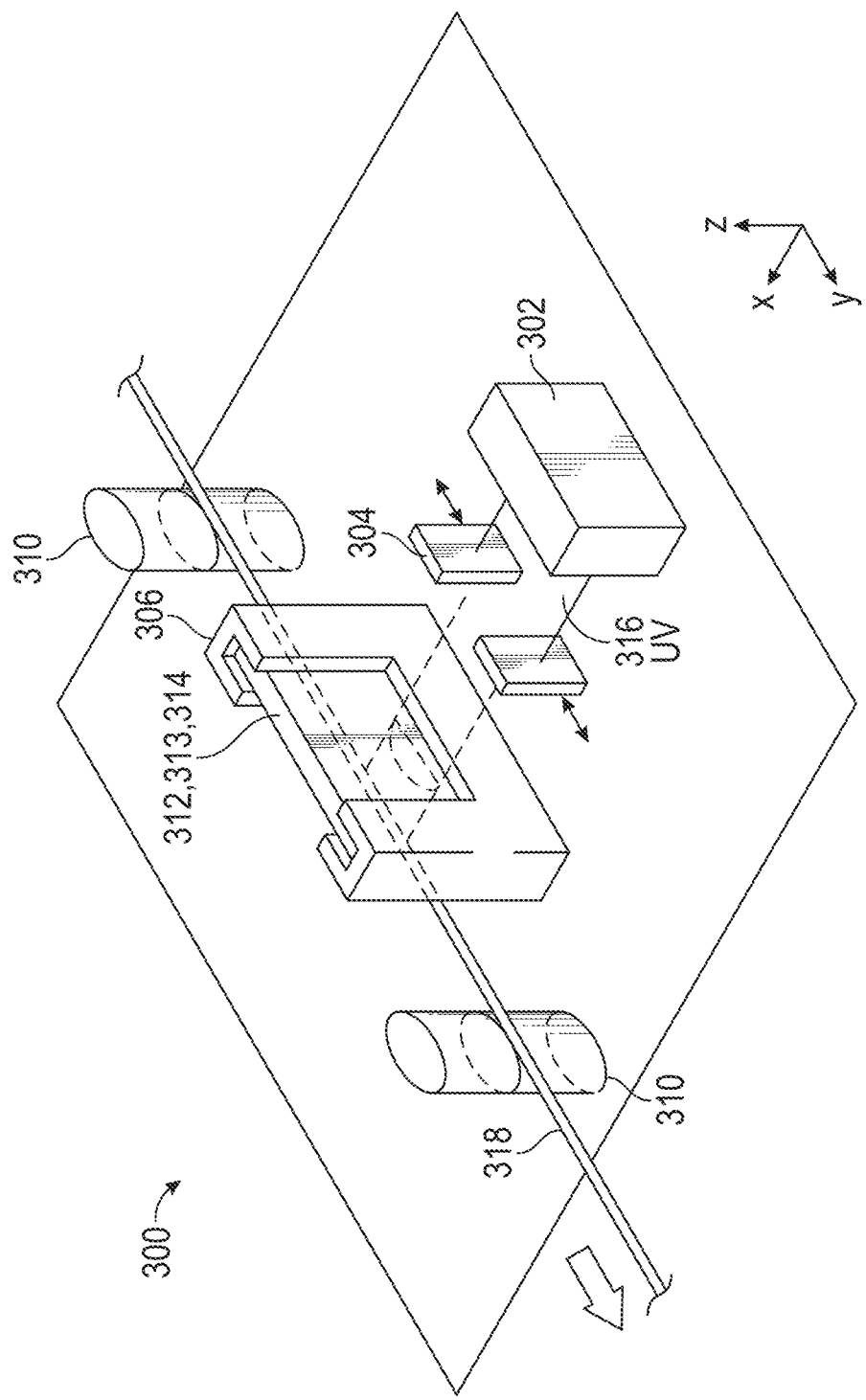
FIG. 3A is a schematic perspective view of part of a system for inscribing overlapping sets of gratings with chirped gratings into an optical fiber in accordance with various embodiments.

FIG. 3A schematically illustrates, in perspective view, parts of an example system 300 employing phase masks to efficiently inscribe overlapping sets of gratings (including one or more sets of chirped gratings) into an optical fiber in accordance with various embodiments. (Note that the drawing is not to scale.) As shown, the system includes a UV laser 302, a variable aperture 304 (e.g., driven by a micrometer), a phase mask holder 306 mounted on a translation stage (not shown), and fiber guides 510. The phase mask holder 306 may hold one or more phase masks. For example, in the embodiment shown in FIG. 3B, the phase mask holder 306 holds three horizontally aligned phase masks 312, 313, 314 arranged in a column. The phase masks 312, 313, 314 may be held in place, for instance, by a clamping mechanism.

The phase mask holder 306 is placed in the UV beam 316 generated by the laser 302, oriented with its normal parallel to the beam axis (herein the x-direction). Via the translation stage, the phase mask holder 306 can be moved relative to the beam 316 in the y and z directions, e.g., using respective micrometers, which may be motorized. Translation in the z direction allows selecting one of the three phase masks 312, 313, 314. The fiber guides 310, which are placed at fixed lateral positions relative to the phase mask holder 306, ensure a horizontal orientation of an optical fiber 318 at a fixed short distance in front of the selected phase mask (on the side opposite the laser 302), e.g., by running the fiber 318 through horizontal grooves in the fiber guides 310. The fiber 318 is movable along its length (i.e., in the y direction) in front of the phase mask 312, 313, 314, e.g., using a precision transport mechanism (not shown), to enable gratings to be written into different fiber portions. The variable aperture 304, which is placed between the laser 302 and the phase mask holder 306, at a fixed position centered on the UV beam 316, allows adjusting the width of beam 316 that is passed to illuminate the phase mask 312, 313, or 314 and fiber 318.

Figure 3B:
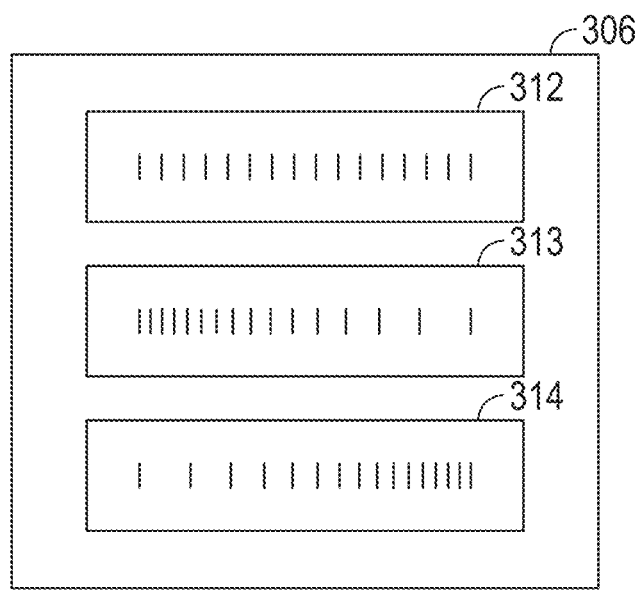
FIG. 3B is a diagram of a phase mask in accordance with various embodiments.

Among the three phase masks 312, 313, 314 shown in FIG. 3B, the line spacing of one phase mask has a uniform period across the phase mask, and the line spacing of the other two phase masks is chirped, i.e., its period increases or decreases from one side of the phase mask to the other side. The chirped phase masks 313, 314 are identical, but one is rotated by 180° relative to the other in the plane of the phase mask (or, put differently, is oriented upside-down) to reverse the direction of the chirp. The chirped phase masks 313, 314, and thus the gratings they create, may be linear in chirp, i.e., have a constant chirp rate, for example, of 2 nm/mm. With this chirp rate, a grating that is, for example, 10 cm in length, covers a 200-nm wavelength range. To write a grating covering a specified wavelength range at a given chirp rate, the corresponding grating length can be set by adjusting the beam width via the aperture 304. The width of the aperture 304 may be set, for example, to 2.5 mm to write a grating that is 2.5 mm in length and spans a 5-nm wide wavelength range. The location of that 5-nm range along the available spectrum can be selected by laterally translating the phase mask 313 or 314 in the y direction, using the translation stage, to position the beam 316 on the respective portion of the phase mask 313 or 314.

Figure 4:
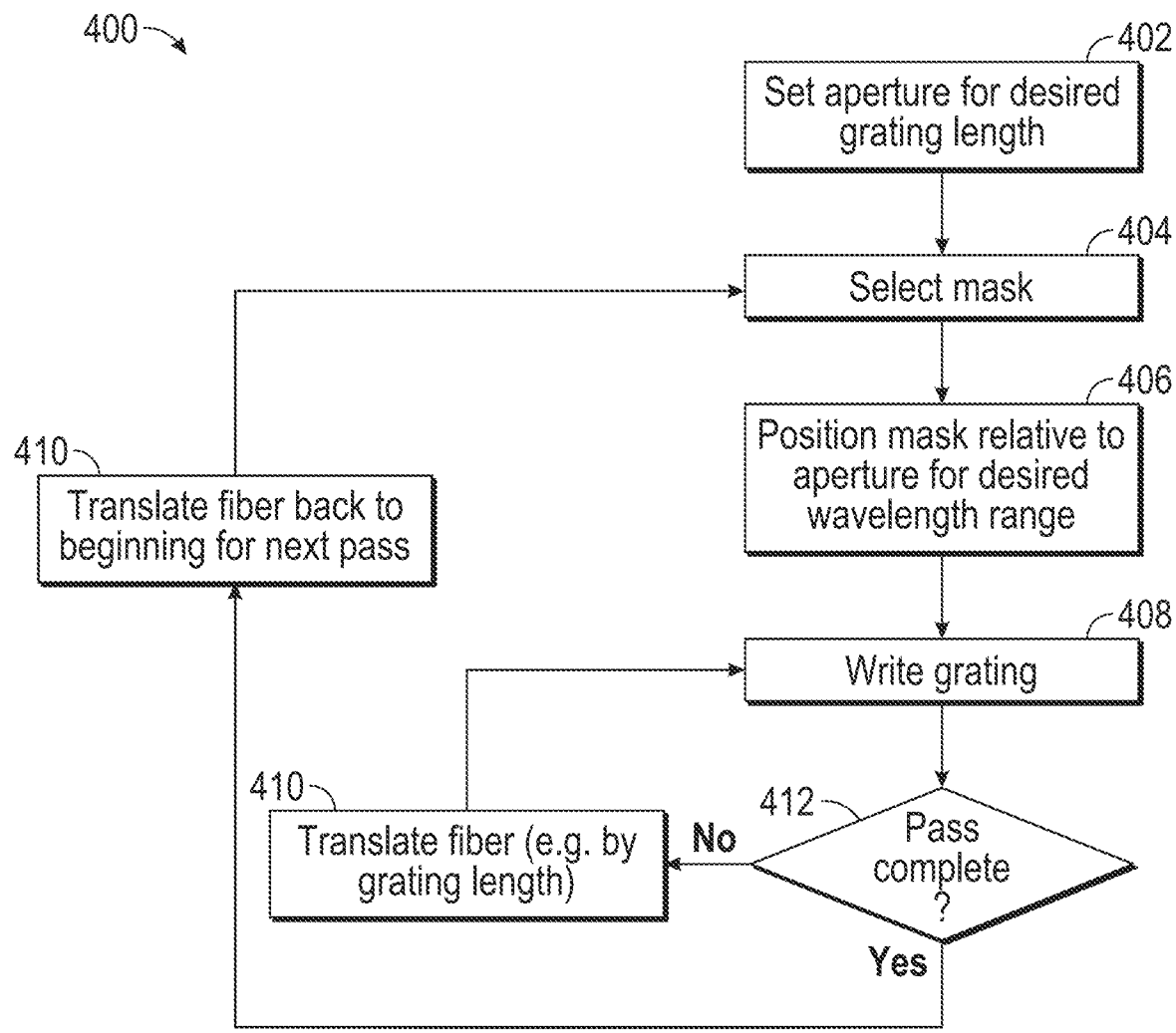
FIG. 4 is a flow chart of a method for inscribing overlapping sets of gratings with chirped gratings into an optical fiber in accordance with various embodiments.

FIG. 4 is a flow chart of an example method 400 for inscribing overlapping sets of gratings (including chirped gratings) into one or more cores of an optical fiber, in accordance with various embodiments. The method 400 may be implemented using, for instance, the system 300 of FIGS. 3A and 3B. In general, the method 400 includes multiple passes through a given section of the fiber (e.g., in some embodiments, the entire length of the fiber), each pass creating one set of gratings extending over the section. Different passes generally differ in the chirp rate and/or the covered Bragg wavelength range of the inscribed gratings. The grating length may (but need not necessarily) be the same for all passes. The wavelength ranges associated with the different passes may be selected such that, together, the multiple sets of gratings cover a certain wavelength range. For example, in some embodiments, a 30-nm wavelength range is achieved with six sets of gratings, each covering a 5-nm wavelength range.

Assuming that the same grating length is used for all passes, the method 400 begins by setting the aperture 304 to the requisite width to achieve the desired grating length (act 402). For each pass, a phase mask with the desired chirp rate and direction is selected, e.g., among the phase masks 312, 313, 314 (act 404), and moved into the UV beam 316 (e.g., using the z stage of the translation stage 308), and the phase mask is positioned relative to the aperture to select a desired wavelength range along the phase mask (act 406). The fiber is illuminated to write a set of gratings of the set length and wavelength range into the core (act 408), and then the fiber is translated along its axis to put the fiber in place for the inscription of the next grating (act 410); in order to write consecutive gratings, the fiber is moved by the grating length. The process is iterated to sequentially write a set of gratings extending over the entire section of fiber, moving the fiber across the phase mask in increments of the grating length in between inscription steps. After the pass has been completed, i.e., the end of the sections has been reached (act 412), the fiber is translated back to the beginning of the section (act 414), possibly with an offset (e.g., as illustrated below with reference to FIG. 7A). The phase mask for the next pass is then selected and, if it differs from the previously used phase masked, moved into the UV beam 316 (act 404). If needed, the phase mask is laterally translated to select the next wavelength range (act 406). The next set of gratings is then written into the fiber core(s) by alternatingly writing a grating and translating the fiber by the grating length (acts 408, 410). (Alternatively, the fiber may be moved continuously, and the laser may be pulsed based on measurements of the fiber position to write the gratings in the proper places. With pulse lengths of, for instance, 10 ns, the fiber motion is practically frozen.) Additional passes through the fiber take place as needed to write the desired number of overlapping sets of gratings.

Figure 9:
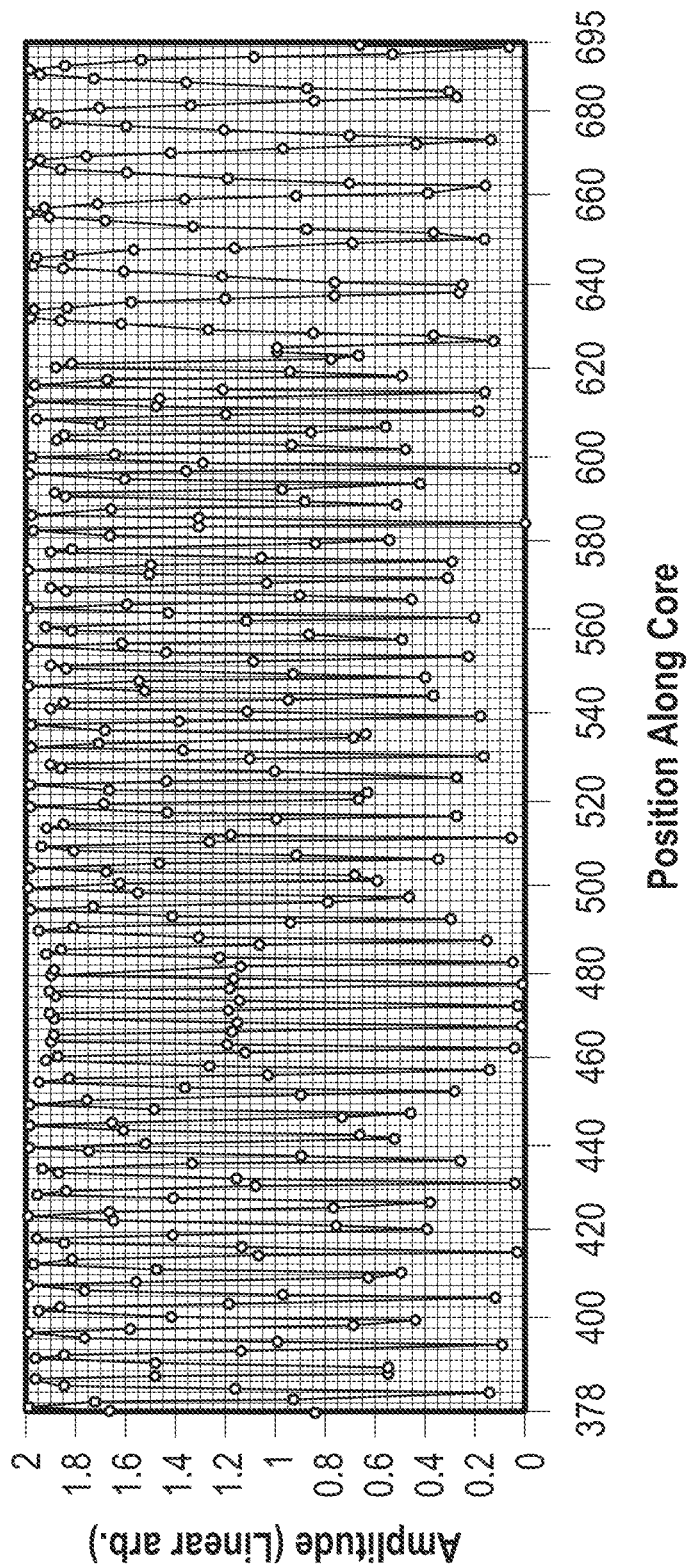
FIG. 9 is a graph showing the signal amplitude, as a function of time delay, of a Bragg reflection signal obtained with an optical fiber including sets of overlapping counter-chirped fiber gratings in accordance with various embodiments.

The method 400 can be varied in a number of ways. For example, when one of the passes involves writing a uniform (rather than chirped) grating, it may be beneficial to adjust the grating length to a higher value (e.g., a multiple of the grating length of a chirped set of gratings) to facilitate covering the section of the fiber in fewer iterations of acts 408, 410. Grating-length adjustments may take place at the beginning of each pass, e.g., before or directly after the selection and positioning of the phase mask (in acts 404, 406). Further, in some embodiments, the phase mask may be switched out within a given pass, e.g., to write a uniform grating in line with gratings having non-zero chirp (non-zero phase variation) (e.g., as illustrated in FIGS. 9 and 10). The same sequence of gratings can be achieved, alternatively, by skipping a subsection of the fiber when writing the chirped gratings, and writing the uniform grating into the skipped subsection in a separate pass. In general, by translating the fiber by amounts other than the grating length, the method 400 allows for writing gratings non-consecutively, with gaps between neighboring gratings or, conversely, with overlap between gratings written in the same pass. In accordance with various embodiments, however, consecutive gratings are beneficial to enable strain determinations along the entire length of the section. It is also noted that the precise order of steps in method 400 as depicted in FIG. 4 need not necessarily be followed in each embodiment. For example, with a precisely controlled translation stage 308 and aperture 304, the adjustment of the aperture width (act 402), the selection and vertical positioning of the phase mask (act 404), and the horizontal positioning of the phase mask (act 406) can generally performed in any order.

Figure 5:
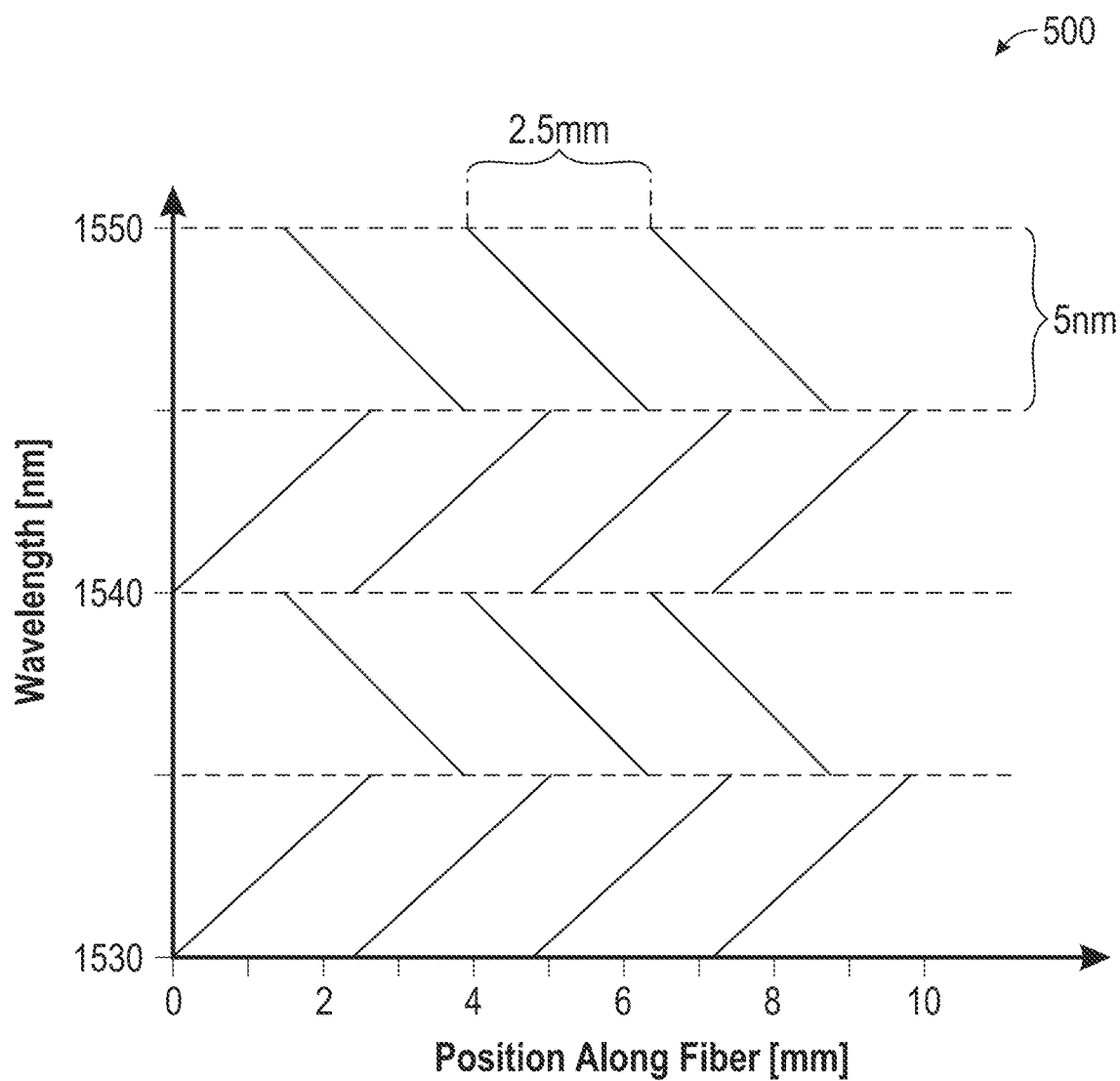
FIG. 5 is a graph showing, for four overlapping gratings inscribed into a fiber core, the grating wavelength as a function of position along the fiber, in accordance with various embodiments.

FIG. 5 illustrates an example grating configuration 500 with four overlapping sets of chirped gratings in a graph of grating (or Bragg) wavelength as a function of position along the fiber. The grating wavelength is shown along the vertical axis, and the position along a 1-cm long section of the fiber is indicated along the horizontal axis. This graph is an ideal representation of the spectrograms that will be described in a later section. Each individual grating corresponds to a diagonal line in the graph, reflecting a decrease or increase in wavelength along the fiber section. The four sets of gratings, each created during a respective pass through the fiber section, are shown as four respective "rows" of such diagonal lines. As can be seen, the gratings all share a common grating length of 2.5 mm and a chirp-rate magnitude of 2 nm/mm such that each row of grating spans a 5-nm wavelength range. The wavelength ranges corresponding to the four sets of gratings are consecutive so that the four rows, collectively, span a 20-nm range, from 1530 nm to 1550 nm. Along this wavelength range, down-chirped gratings (whose frequency decreases down the length of the fiber) alternate with up-chirped gratings (whose frequency increases down the fiber). Thus, within a pair of adjacent gratings, the gratings are counter-chirped. Further, as shown, the up-chirped gratings are offset relative to the down-chirped gratings by half the common grating length.

The grating configuration 500 of FIG. 5 is one example of configurations useful for accurately and precisely determining both strain and the location along the fiber where the strain occurs. In general, in accordance with various embodiments, grating configurations that facilitate strain delay registration include two or more overlapping sets of gratings, at least one set of gratings being chirped, with different sets of gratings differing in the direction of the chirp and/or in the magnitude of the chirp rate (allowing for uniform, non-chirped gratings, which have a chirp rate equal to zero). As will be explained below, overlapping sets of gratings that are not chirped in the same manner generally result in unique maxima across a range of time delays and frequency shifts in a correlation signal, facilitating strain measurements to be uniquely associated with locations along the fiber.

In the following, Bragg reflection spectrograms and associated correlation signals for various grating configurations will be described. In accordance herewith, a measured time-domain reflection signal is generally processed by short-time Fourier transform (STFT). For each point in the time-domain data, STFT creates a reflection spectrum (that is, computes a signal amplitude as a function of frequency) by Fourier-transforming a short segment of the time-domain signal associated with (e.g., beginning at) that point. The resulting spectra are stacked along the time dimension to obtain a two-dimensional time-frequency image of the signal, commonly referred to as a spectrogram.

Let the two-dimensional function s(f,t) denote the reflection-signal amplitude (i.e., the amplitude of the spectrogram) as a function of time delay and frequency, and let the one-dimensional function s (f|t) denote the reflection spectrum, i.e., the reflection-signal amplitude as a function of frequency, at a given time delay t. Further, let the subscript "ref" denote a reference signal or spectrum. The cross-correlation between a reflection spectrum s(f|t) at time delay t and a reference reflection spectrum $S_{ref}$(f|t) at time delay t' is then given by:

$$c(\Delta f|t,t')=\int s_{ref}(f|t')s(f+\Delta f|t)df,$$

which is a function of the frequency shift $\Delta f$ between the spectrum s (f|t) and the reference spectrum $S_{ref}$(f|t'). In accordance with various embodiments, each (time-delay-dependent) reflection spectrum s(f|t') of a measurement signal is cross-correlated (herein also simply "correlated") with each of a plurality of reference reflection spectra $S_{ref}$(f|t') that collectively cover a range of time delays t' including the respective time delay t of the measurement spectrum. This range may be, e.g., a symmetric range up to maximum expected time-delay shift $\Delta t$ between measurement and reference signals, t−$\Delta t$≤t'≤t+$\Delta t$, or, if time-delay shifts are expected in only one direction, an asymmetric range, e.g., t−$\Delta t$≤t'≤t. The cross-correlations are assembled across the range of time delays t' into a correlation signal as a function of time delay t' and frequency shift $\Delta f$, c(t',$\Delta f$|t). If the spectrum measured at time t is time-delay-shifted by $\Delta t$ and frequency-shifted by $\Delta f$ with respect to the reference spectrum originating from the same location of the fiber, the correlation signal will have a peak, or maximum, at t'=t−$\Delta t$, $\Delta f$. Accordingly, by identifying a (unique) correlation peak in the correlation signal c(t',$\Delta f$|t) for each measurement spectrum s(f|t), the measurement signal can be mapped onto pairs of a time delay t' of the reference signal (corresponding to a particular location on the fiber) and an associated frequency shift $\Delta f$ (corresponding to strain at that location), and, thus, to strain as a function of position along the fiber. In some embodiment, the correlation function, instead of reflecting cross-correlations of a single measurement spectrum with a range of reference spectra, assembles the cross-correlations of a single reference spectrum, corresponding to a particular location along the fiber, with measurement spectra covering a range of time delays. Aggregated over all reference spectra, the varied correlation signals c(t, $\Delta f$|t') result in the same determination of strain along the fiber.

It is noted that correlation signals may be (and are herein) shown as a function of time delay and a frequency that corresponds to the sum of the frequency shift and some fixed-frequency offset. For example, when correlating measured reflection spectra with the spectra of a single-frequency grating, the frequency shift may be offset by the Bragg frequency of the single-frequency grating, to associate each correlation peak with the actual reflected Bragg frequency at the respective fiber location. From the frequency of a correlation peak, the associated frequency shift can, of course, be straightforwardly calculated. Herein, reference to correlating spectra, or determining correlation maxima, "across frequency" shall be understood as synonymous with correlating spectra, or determining correlation maxima, "across frequency shift."

Figure 6A:
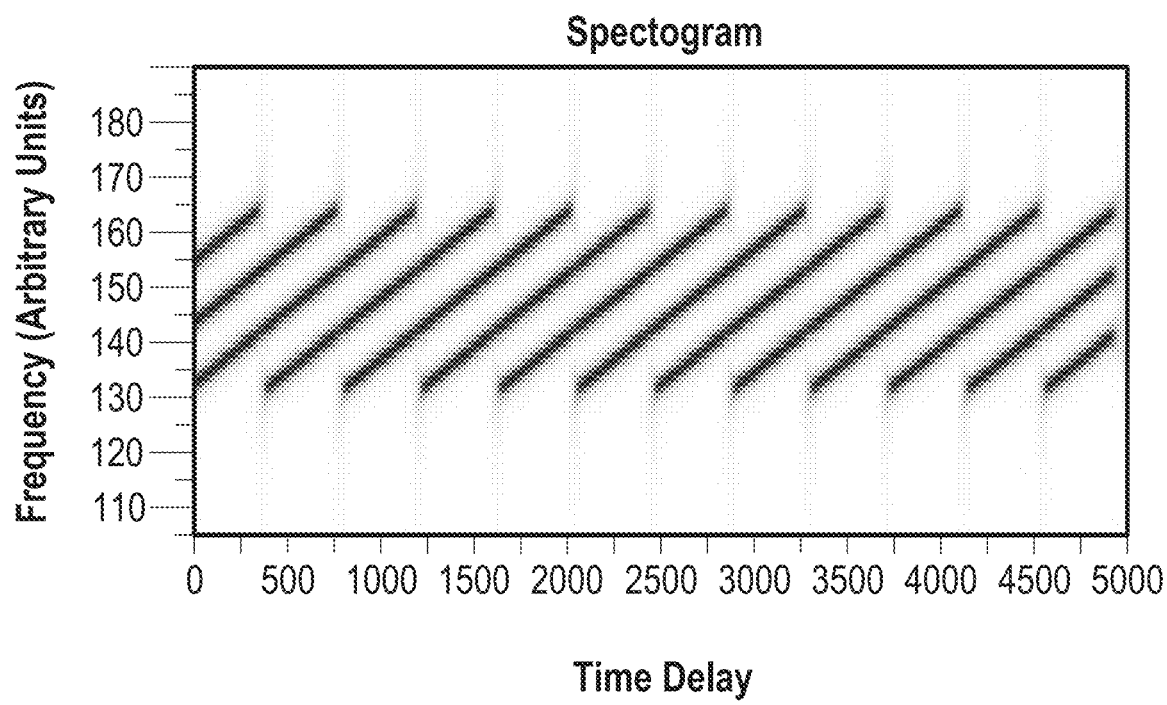
FIG. 6A shows an example reference Bragg reflection spectrogram for an optical fiber including a series of equally chirped overlapping fiber gratings.
Figure 6B:
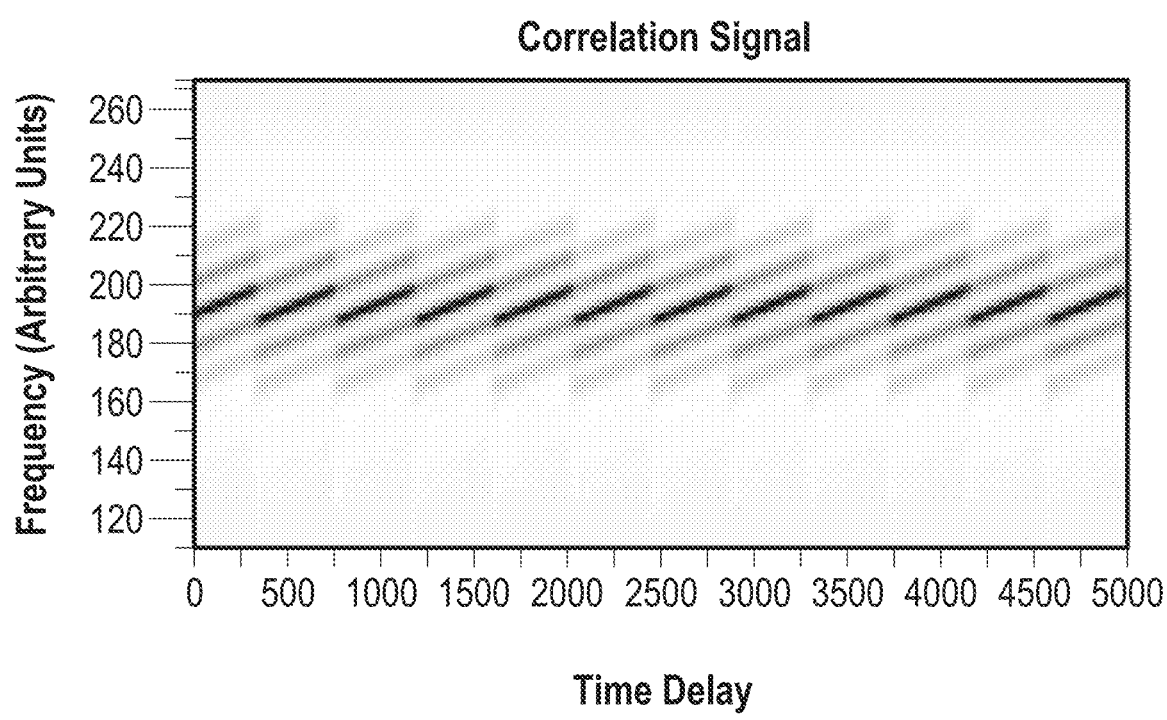
FIG. 6B shows an example correlation signal resulting from correlating, with the reference reflection spectrogram of FIG. 6A, a Bragg reflection spectrum acquired with the same optical fiber for a given time delay.

With reference to FIGS. 6A and 6B, for comparison with overlapping, differently chirped sets of gratings in accordance herewith, consider first the Bragg reflection spectrogram and associated correlation signal for an optical fiber including a set of equally chirped overlapping fiber gratings. In the spectrogram of FIG. 6A, the spectral peaks show the frequency of such as set of chirped gratings as a function of time delay, corresponding to the location along the fiber. As can be seen, the gratings partially overlap, each grating being translated by a third of the grating length relative to its immediate neighbor(s), resulting, in conjunction with the chirp, in three Bragg reflection peaks for each time delay.

FIG. 6B shows an example correlation signal resulting from correlating, with the spectrogram of FIG. 6A as a reference, a Bragg reflection spectrum acquired with the same optical fiber for a particular time delay. (Note that the correlation signals as depicted in FIGS. 6B, 7B, and 8B cover the entire range of the respective reference reflection spectrograms shown in FIGS. 6A, 7A, and 8A. Also, the vertical axis reflects the frequency shift only up to some arbitrary offset.) The correlation signal forms parallel diagonal lines, brightest in a center section, shifted relative to each other in time delay by the time-delay distance of two neighboring gratings in the reflection signal of FIG. 6A. If this time-delay distance is greater than the maximum expected time delay between reference and measurement signals (which is generally limited due to physical considerations, such as maximum expected strains), each measurement spectrum can be mapped onto one of the lines in the correlation signal. That does, however, not resolve the ambiguity between strain effects and time-delay effects presented by the line. Thus, although the chirped gratings provide a wideband reflection signal as generally affords good resolution, they do not allow for strain delay registration.

Figure 7A:
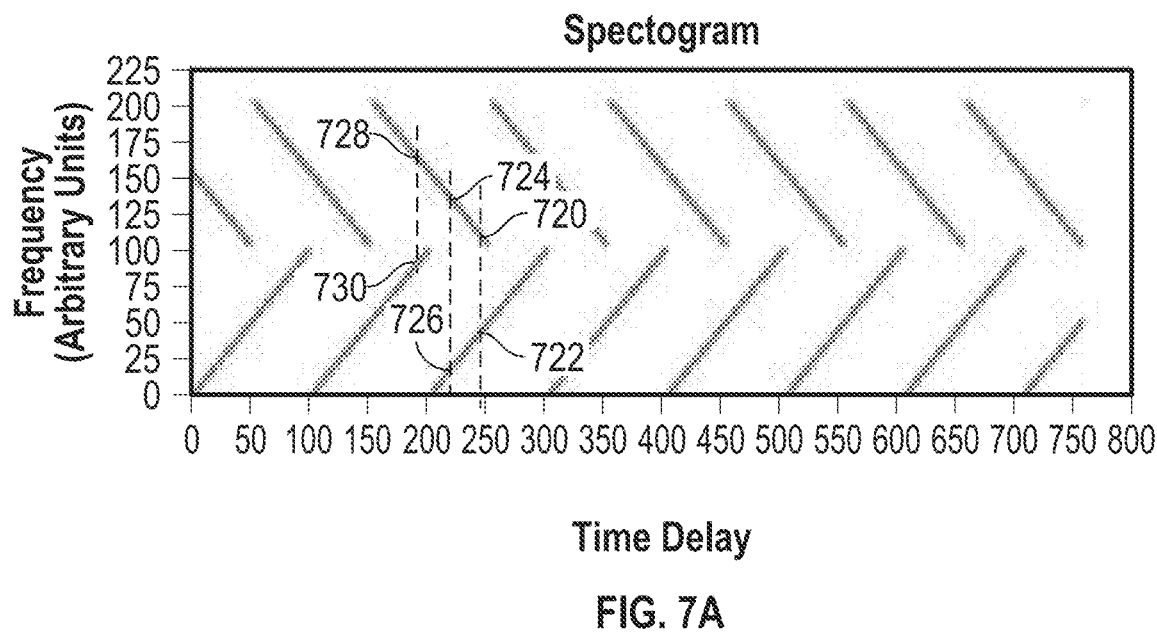
FIG. 7A shows an example reference Bragg reflection spectrogram for an optical fiber including sets of overlapping counter-chirped fiber gratings, in accordance with various embodiments.
Figure 7B:
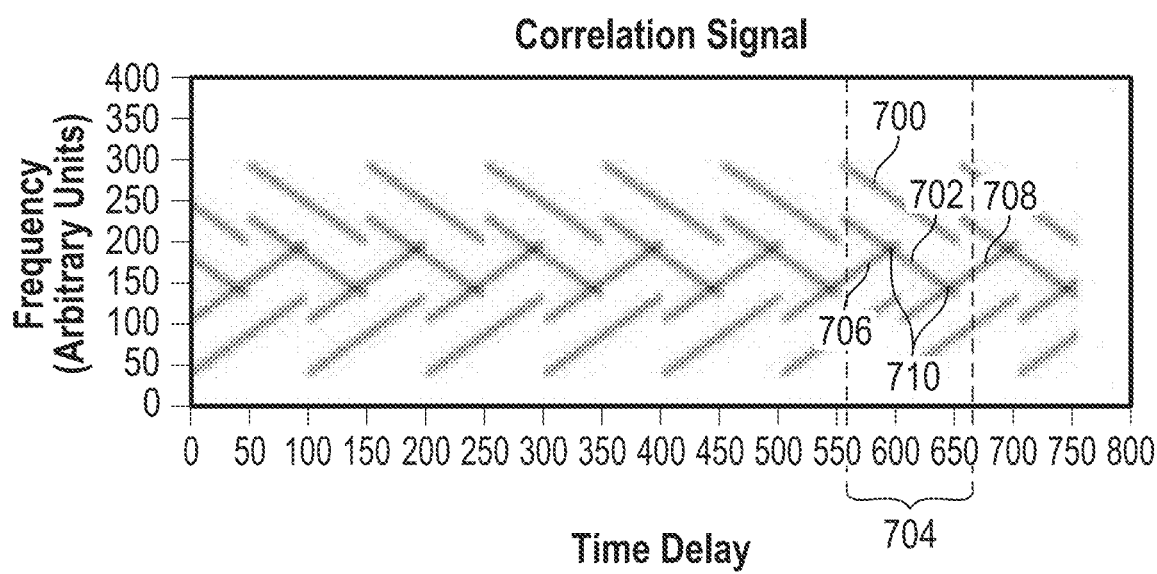
FIG. 7B shows an example correlation signal resulting from correlating, with the reference reflection spectrogram of FIG. 7A, a Bragg reflection spectrum acquired with the same optical fiber for a given time delay.

Referring now to FIGS. 7A and 7B, a Bragg reflection spectrogram and example associated correlation signal for an optical fiber including two overlapping sets of counter-chirped fiber gratings in accordance with various embodiments are shown. As can be seen in FIG. 7A, the time-delay dependent Bragg frequencies for the two sets of gratings form a "herringbone" pattern, with a set of up-chirped gratings covering a first range of frequencies and a set of down-chirped gratings covering a second range of higher frequencies that is consecutive with the first range. Neighboring gratings within each set are translated by the grating length, i.e., the gratings are consecutive (without overlap). As between the two sets, the gratings are shifted. In the example shown in FIGS. 7A-7B, the shift is by half a grating length, and other implementations may use sets of gratings with other amounts of shift (such as by a third grating length, quarter grating length, a fifth grating length, etc.). In some implementations, the two sets of gratings may have zero shift, although zeros can occur in the signal amplitude at locations where the Bragg frequencies of the two overlapping gratings are the same, which causes destructive interference of the reflected light in the event that the refractive-index maxima of one grating are shifted by half a grating period relative to those of the other grating. Therefore, it is beneficial to laterally offset the overlapping gratings by some non-zero amount.

As shown in FIG. 7B, the correlation of a spectrum at a given time delay with the spectra of FIG. 7A used as a reference forms two sets of parallel lines, corresponding to the two sets of gratings. Each set of lines may include, for each individual grating, multiple (e.g., as depicted, two) lines within the respective time-delay range. The vertical separation between these lines (e.g., the vertical separation between the lines 700, 702 within time-delay range 704) generally varies as a function of the particular time delay, and corresponding location with the reflection pattern, where the measurement spectrum is obtained. Due to their different orientations (or gradients), some lines from one set intersect with some lines from the other set (e.g., line 702 intersects with lines 706, 708), forming distinct correlation peaks 710 in time delay and frequency (corresponding to frequency shift) that repeat only at intervals corresponding to half the grating tenth, largely resolving the ambiguity between time-delay shifts and frequency shifts.

Intuitively, the cross-correlation between a measurement reflection spectrum and a reference reflection spectrum originating from the same location along the fiber will result in a single correlation peak across frequency, the frequency shift associated with the peak (if any) resulting from fiber strain at that location. By contrast, as between two reflection spectra (e.g., a measurement reflection spectrum and a reference reflection spectrum) measured for two different locations along the fiber, one will generally exhibit reflection peaks at frequencies that are farther apart or closer together than the reflection peaks of the other. To illustrate, in FIG. 7A, the reflection peaks 720, 722 at time delay 250 are closer together than the reflection peaks 724, 726 at time delay 200. As a result, the cross-correlation between a measurement reflection spectrum and a reference reflection spectrum originating from two different locations along the fiber will generally result in two correlation peaks across frequency. An exception, due to the periodicity of the gratings, is that, for measurement and reference reflection spectra that are displaced along the fiber by multiples of half the grating length, the corresponding pairs of reflection peaks (e.g., in FIG. 7A, the pair of peaks 720, 722, and the pair of peaks 728, 730 half a grating period to the left) have the same frequency distance, and thus result in a single correlation peak across frequency. The resulting ambiguity in correlation peaks does, however, not cause confusion about which peak is the correct solution (as could create false positives) if the grating length is chosen such that any time-delay shifts in excess of half the grating length are non-physical. For a fiber-sensing application with a one-meter sensing length, a grating length of at least 2.5 mm limits permitted strains to 1250 microstrain.

Beneficially, the presence of at least two correlation peaks across frequency in most time slices of the correlation signal allows estimating the location of the (higher-amplitude) correlation peak across both time delay and frequency shift: from cross-correlations computed merely for two or more discrete time delays, the estimated location can be found by fitting two curves to the correlation peaks identified in the cross-correlations for the two or more discrete time delays and extrapolating to find their intersection. Based on the estimated location, the search space for the correlation peak across time delay and frequency shift can be reduced, saving computational cost and speeding up the process of identifying matching locations along the fiber for each measurement spectrum.

Figure 8A:
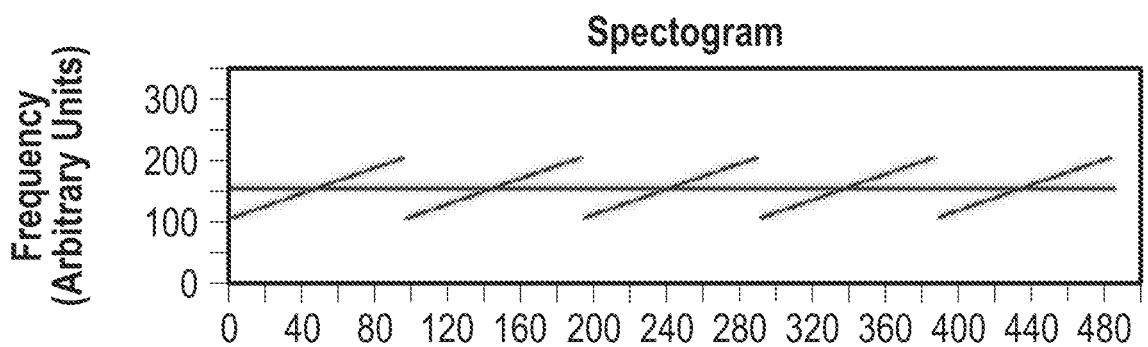
FIG. 8A shows an example reference Bragg reflection spectrogram for an optical fiber including a set of chirped fiber gratings overlapping with a single-frequency grating, in accordance with various embodiments.
Figure 8B:
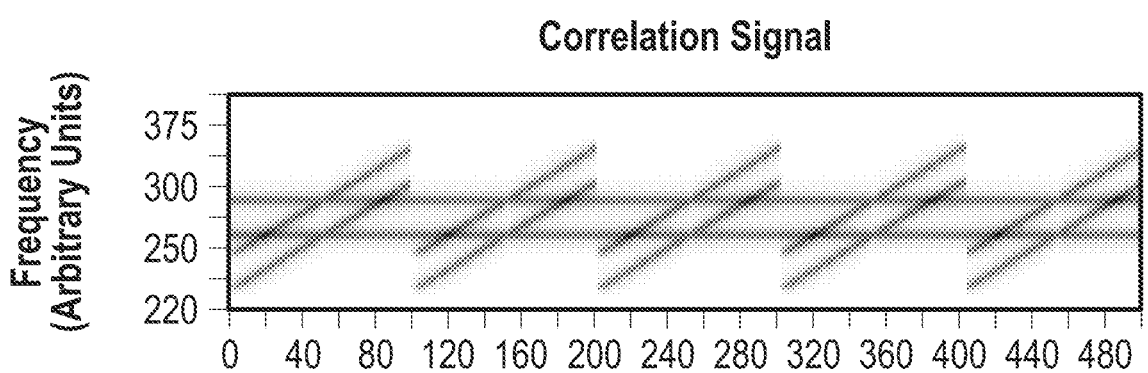
FIG. 8B shows an example correlation signal resulting from correlating, with the reference Bragg reflection spectrogram of FIG. 8A, a Bragg reflection spectrum acquired with the same optical fiber for a given time delay.

With reference to FIGS. 8A and 8B, as another example of grating configurations in accordance with various embodiments, a Bragg reflection spectrogram and associated correlation signal, respectively, for an optical fiber including a set of chirped gratings overlapping with a single-frequency grating are shown. In the depicted example, as can be seen in FIG. 8A, the Bragg frequency of the single-frequency grating falls within the range of frequencies spanned by the chirped gratings. As shown in the example correlation signal of FIG. 8B, the correlation signal resulting from correlating, with the reference signal of FIG. 8A, a Bragg reflection spectrum acquired with the same optical fiber for a given time delay forms a set of parallel pairs of diagonal lines (each pair of lines corresponding to one of the chirped gratings) intersecting a pair of horizontal lines (corresponding to the single-frequency grating). Thus, the correlation signal exhibits distinct correlation peaks with pairs of peaks that repeat every grating length. While the two correlation peaks for each chirped grating result in some ambiguity, this ambiguity can be resolved if the distance between these peaks is long enough to render only one of the peaks physical, that is, within the range of expected time-delay shifts. In general, the distance between the peaks varies as a function of the delay associated with the measurement spectrum from which the correlation signal is computed, such that some, but not all of the peaks can be disambiguated based on the correlation signal alone. For the remaining pairs of correlation peaks, disambiguation can be achieved by extrapolation from disambiguated peaks in their vicinity, based on the assumption that the correlation peaks shift continuously with time delay.

Both FIG. 7A and FIG. 8A show grating configurations that use sets of multiple consecutive gratings of the same length and chirp rate. While it is, in principle, possible to cover the desired frequency range with a single grating (or fewer gratings) with smaller chirp rates, higher chirp rates generally provide for better accuracy in determining the correlation peak and, thus, the location of the measured strain. Accordingly, it may be beneficial to set the grating length to a small value that, however, still suffices to exceed the length associated with maximum expected time-delay shift.

The chirped-grating configurations described herein deliberately introduce controlled broadband features into the fiber, eliminating the need to rely on imperfections in uniform (i.e., single-frequency) gratings for establishing corresponding points in time delay between measurement and reference signals. Beneficially, compared with the random broadband features resulting from imperfections, which concentrate all power of the reflection at one frequency, the controlled broadband features resulting from overlapping chirped gratings generally provide better spatial resolution and are less demanding on analog-to-digital signal conversion of the measured signals. In certain cases, however, the broadband features introduced by overlapping chirped gratings are less useful than the broadband features inherent in uniform gratings. For example, in the context of a bend measurement (bend being computed from strain in two fiber cores) in the presence of Doppler signal distortion resulting from a shape change of the fiber during a single laser scan, uniform gratings provide a more robust bend measurement because of differences in the effect of Doppler signal distortion on the underlying phase tracking algorithm.

To illustrate this problem, refer to FIG. 9, which shows the amplitude, as a function of time, of a reflection signal obtained with a "herringbone" grating configuration as shown in FIG. 7A. As can be seen, the amplitude includes numerous zeros. With zeros in the signal amplitude, getting good phase measurements will require the reference and measurement signals to be lined up accurately, and the phase modulation during a laser scan, resulting from a shape change undergone by the fiber during the scan, to be approximately linear in time. This is not always a good assumption. The fiber may, for example, vibrate, causing sinusoidal time-delay shifts, or may undergo some other strongly non-linear shape change. In situations where the condition of linear phase modulation is not satisfied, overlapped chirped gratings may result in lower accuracy than uniform gratings.

Robustness in bend measurements becomes very important if the measurement is used in feedback control loops, as are employed to control, e.g., robot joints and the tips of steerable catheters. Especially with high-speed control loops (e.g., operating at about 600 Hz or above) generating high forces, an incorrect bend measurement can have drastic consequences, such as uncontrolled motion. Robust bend measurements at joints are also important because the fiber may be subjected to tighter bends and more rapid bend changes in the joints. In these cases, some level of uncertainty in the position of the measured strain along the fiber (that is, loss of registration in the fiber section at, e.g., the joint or catheter tip) is acceptable if it serves to render the measurement of the bend angle more robust. Accordingly, it can be beneficial to place single-frequency gratings in the fiber at joints, steerable catheter tips, and the like.

Figure 10A:
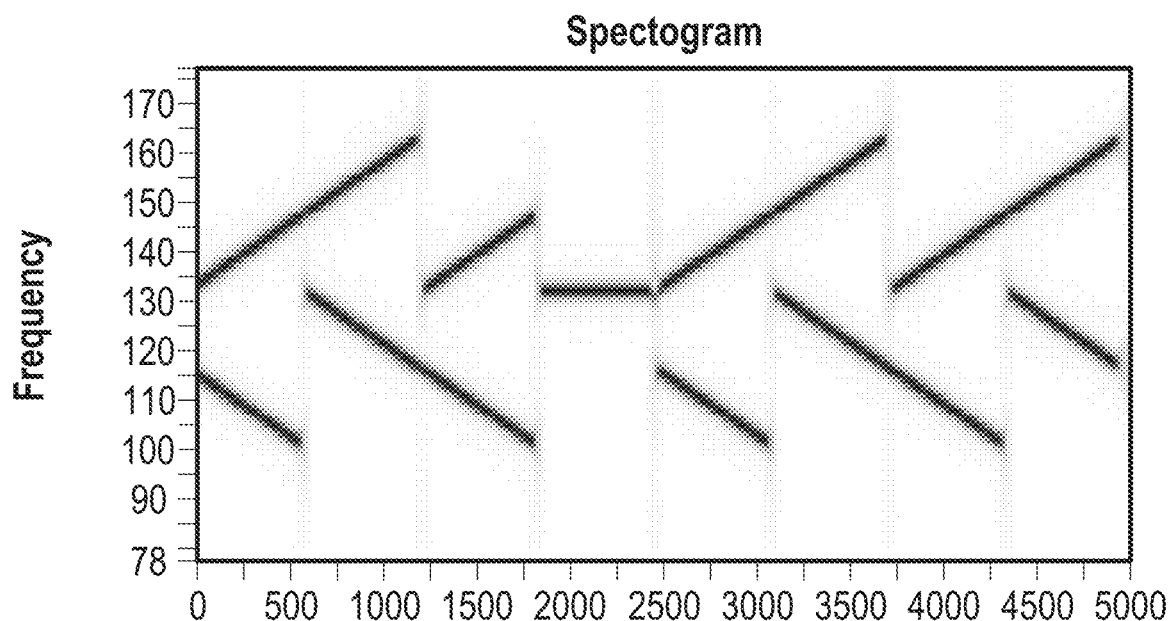
FIGS. 10A and 10B show example Bragg reflection spectrograms for respective optical fibers including sets of overlapping counter-chirped fiber gratings consecutive with a single-frequency grating, in accordance with various embodiments.
Figure 10B:
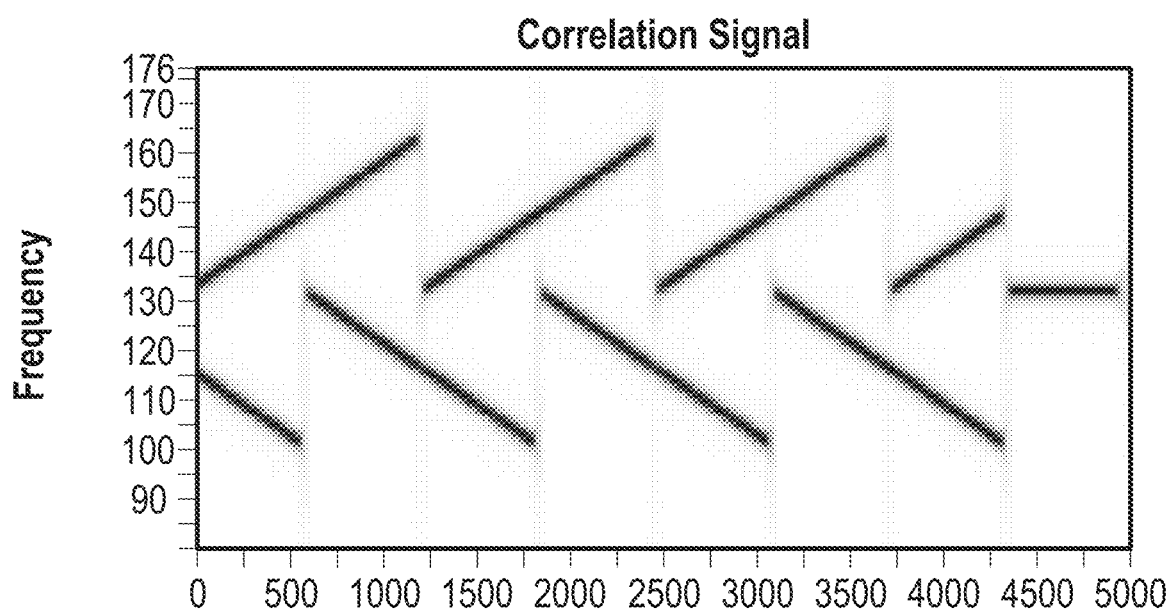

FIGS. 10A and 10B show example Bragg reflection spectrograms taken with respective optical fibers including sets of overlapping counter-chirped fiber gratings consecutive with a single-frequency grating, in accordance with various embodiments. In FIG. 10A, the single-frequency grating is located in a mid portion of the optical fiber, between two fiber sections including overlapping sets of chirped gratings. The single-frequency-grating section may be placed, e.g., through a joint. A typical joint may be between 3 cm and 10 cm in length, allowing the entire length of the single-frequency grating to be written with a suitable phase mask in a single step. FIG. 10B illustrates a single-frequency grating placed at an end portion (e.g., the tip) of the optical fiber, where, e.g., a steerable catheter tip may be located. In most applications, the single-frequency grating sections of fiber can be kept relatively short (e.g., at less than 10 cm) compared with the total length of the fiber. Delays accumulate along the length of the fiber, and small lengths of fiber with single-frequency gratings will accumulate a correspondingly small amount of delay error.

Figure 11:
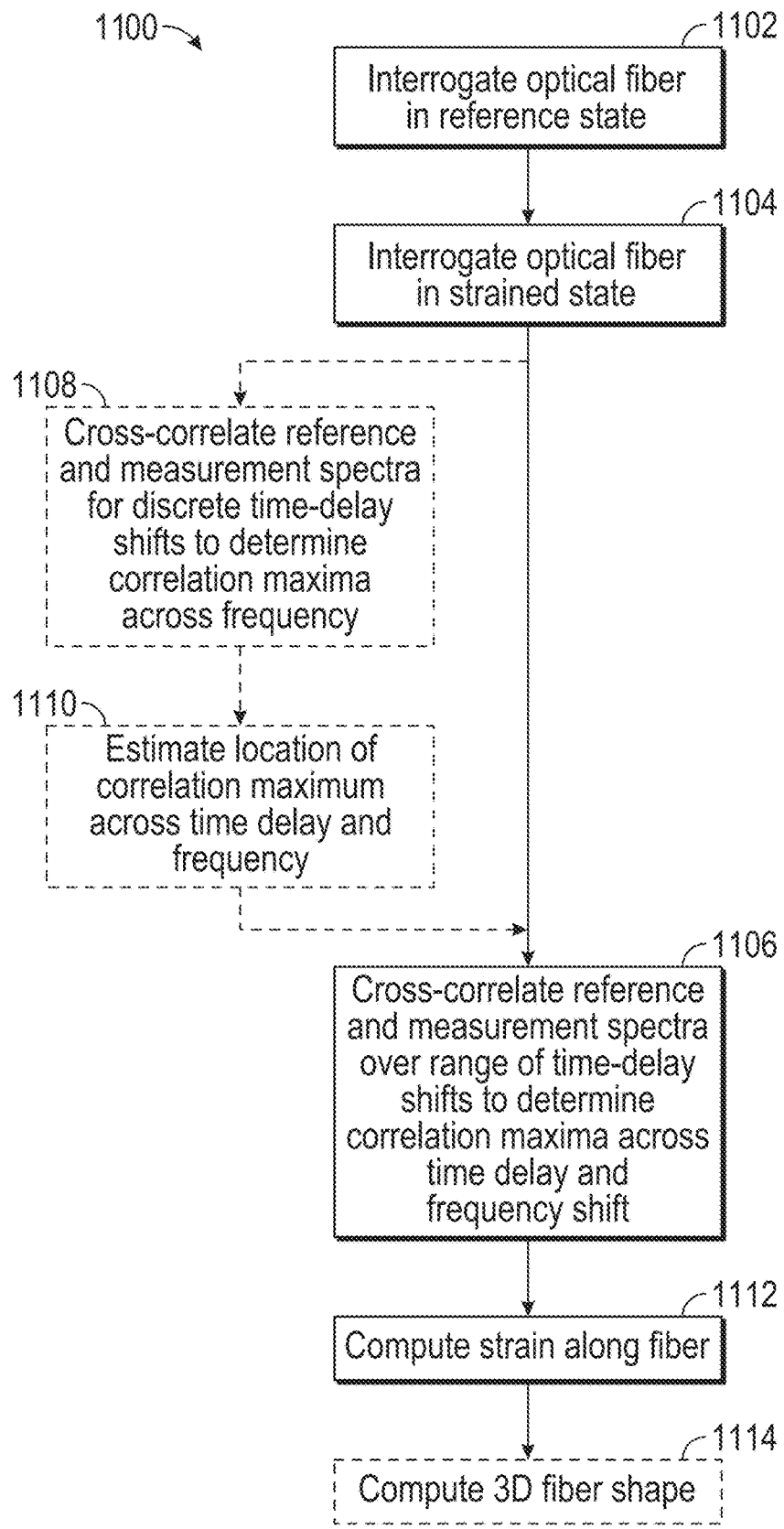
FIG. 11 is a flow chart illustrating methods of measuring strain along an optical fiber with overlapping gratings, in accordance with various embodiments.

FIG. 11 is a flow chart illustrating a method 1100 of measuring strain along an optical fiber with overlapping sets of gratings, in accordance with various embodiments. The fiber includes at least two overlapping sets of gratings inscribed in a fiber core, wherein a first one of the sets of gratings includes one or more chirped gratings and a second one of the set of gratings includes one or more gratings that are either not chirped at all or are chirped differently than the grating(s) of the first set. The method 1100 includes interrogating the optical fiber in a reference state of the fiber to obtain a reference signal including first time-delay-dependent reflection spectra ("reflection spectra") resulting from combined reflections off the two (or more) sets of gratings (act 1102); each time delay of these first time-delay-dependent reflection spectra corresponds to an associated physical position along the fiber. The method 1100 further includes interrogating the optical fiber in a strained state of the fiber to obtain a measurement signal including second time-delay-dependent reflection spectra ("measurement spectra") likewise resulting from combined reflections off the two (or more) sets of gratings (act 1104).

The reference reflection spectra are cross-correlated in frequency with the measurement reflection spectra to determine correlation maxima across time delay and frequency, each correlation maximum corresponding to a pair of one of the reference reflection spectra and one of the measurement reflection spectra and to a frequency shift therebetween (act 1106). For example, each of the measurement reflection spectra may be cross-correlated with a respective plurality of reference spectra (covering a range of time delays including the time delay associated with the respective measurement reflection spectrum) to determine a correlation maximum across the time delays associated with the plurality of reference reflection spectra and across frequency. Alternatively, for each of the plurality of positions along the fiber, the associated reference reflection spectrum may be correlated with a plurality of the measurement reflection spectra to determine a correlation maximum across time delays of the measurement reflection spectra and across frequency for that position along the fiber.

In some embodiments, a full search over the entire possible range of time-delay shifts (between reference and measurement spectra) and frequency shifts is performed, at a specified resolution (corresponding to increments in time delay and frequency shift), to identify the correlation maximum for each correlation signal (c(t',Δf|t) or c(t, Δf|t')). In other embodiments, correlation maxima across frequency, including a correlation maximum associated with the first set of gratings and a correlation maximum associated with the second set of gratings, are determined for two or more discrete time-delay shifts (act 1108) to estimate a location of the correlation maximum by extrapolation from those correlation maxima (act 1110), and the search for the correlation maximum is then performed (in act 1106) near an estimated location of the correlation maximum. From the time delays and associated frequency shifts of the correlation maxima determined in act 1106, strain along the optical fiber can be computed (act 1112). In some embodiments, simultaneous strain measurements for multiple cores of a single fiber are further processed, in accordance with techniques well-known in the art, to determine the three-dimensional fiber shape (act 1114).

Figure 12:
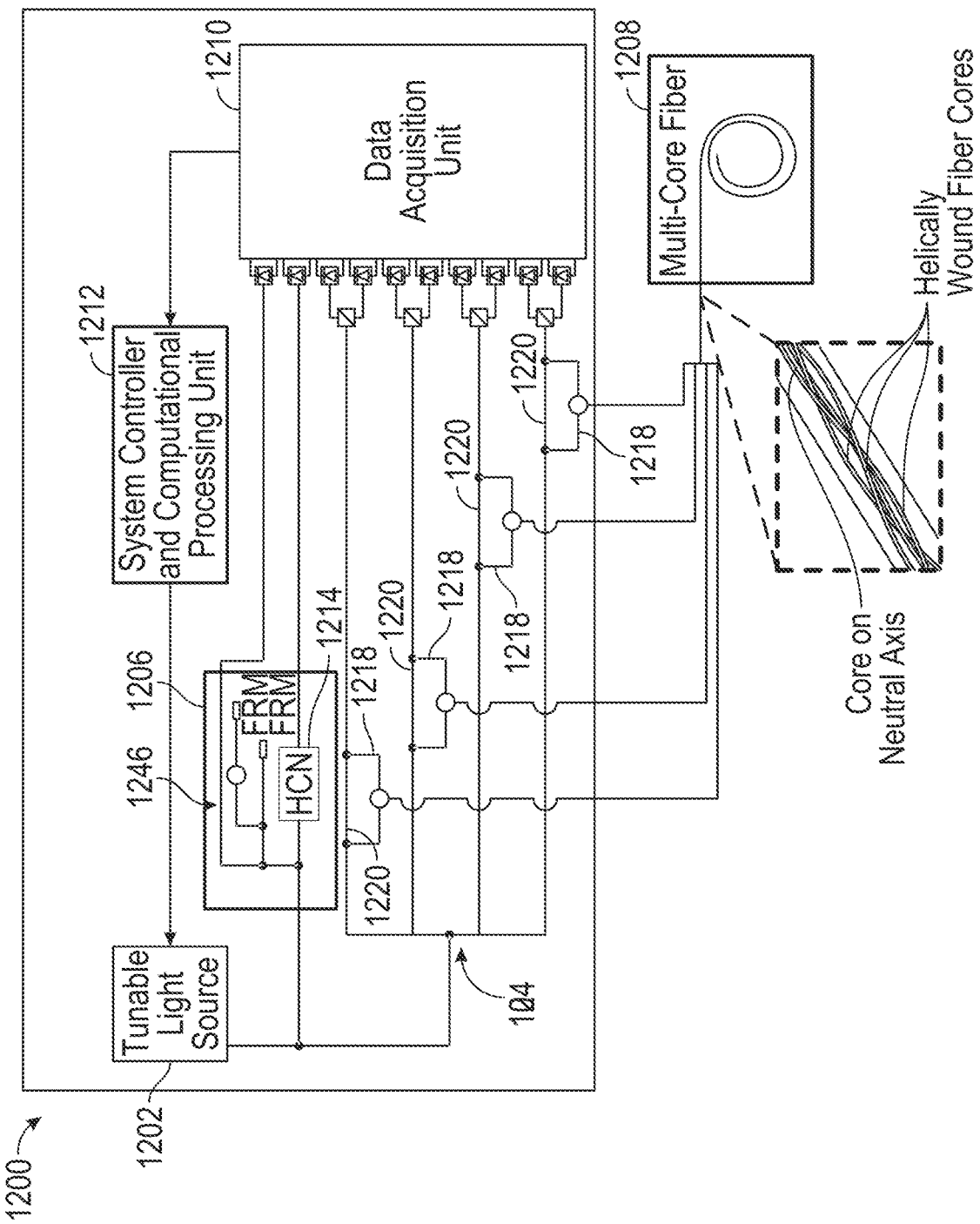
FIG. 12 is a block diagram of an example strain measurement system in accordance with various embodiments.

FIG. 12 is a block diagram of an example strain measurement system 1200 in accordance with various embodiments. The system 1200 implements swept-wavelength interferometry (such as OFDR), and includes a tunable light source 1202 (usually a laser, although other light sources may be used), an interferometric interrogator network 1204, a laser monitor network 1206, an optical fiber 1208 serving as a distributed sensor, a data acquisition unit 1210, and a computing system 1212 serving as system controller and computational processing unit (and thus also referred to as "computational processing unit 1212" herein). The computing system 1212 includes a suitable combination of hardware and software, such as one or more general-purpose hardware processors (e.g., central processing units (CPUs)) executing software programs and/or one or more special-purpose hardware processors or circuitry (such as, e.g., application-specific integrated circuits (ASICs), field-programmable gate arrays (FPGs), or digital signal processors (DSPs)). The computing system 1212 may be implemented as a single device, or with multiple (intercommunicating) devices, such as, e.g., separate devices for the system controller, which controls the operation of the light source 1202 and/or other actively controlled system components, and for the computational processing unit, which processes raw data received from the data-acquisition unit 1210.

The optical fiber 1208 may be a single-core fiber or, as shown, a multi-core fiber, depending on its use. A single fiber core can be used for distributed strain sensing. For shape-sensing applications, a multi-core fiber including, for example, a center core (or waveguide) located about the central axis of the fiber and three or more outer cores (waveguides) arranged helically around the center core at a given radial distance therefrom may be used. Strain measurements taken along the length of each core, in conjunction with knowledge of the relative positions of the cores along the length of the shape-sensing fiber, can be combined to obtain a strain profile of the fiber (e.g., including measures of bend, twist, and axial strains), from which the three-dimensional position and orientation of the fiber can be reconstructed. To facilitate strain delay registration in accordance herewith, each core of the optical fiber 1208 includes two or more overlapping sets of gratings differing in chirp. In some embodiments, the gratings extend along the entire length of the fiber 1208 to facilitate strain measurements at each position along the fiber 1208. While the two or more overlapping sets of gratings may extend over large fiber sections, overlap may be interrupted in one or more short fiber sections (e.g., located at fiber bends or at the fiber tip) containing only a single-frequency grating, e.g., as described with respect to FIGS. 10A and 10B. In various medical applications, a (distal) section of the optical fiber may be located inside a catheter. The distal end of the catheter, where a medical device (e.g., a surgical tool) may be located, may be steerable. For robust strain measurements in that region, a single-frequency grating may be located near the tip of that catheter.

During an OFDR measurement, the light source 1202 is swept through a range of wavelengths (or frequencies). Light emitted by the light source 1202 is split with the use of optical couplers and routed to the laser monitor network 1206 and the interferometric interrogator network 1204. The laser monitor network 1206 may contain a Hydrogen Cyanide (HCN) gas cell 1214 that provides an absolute wavelength reference throughout the measurement scan, and an interferometer 1216 used to measure fluctuations in tuning rate as the light source 1202 is scanned through the wavelength range. The interferometric interrogator network 1204 may include one or more interferometric interrogators, generally one for each core of the optical fiber 1208. In the depicted example system 1200, a four-channel system having four interferometric interrogators is used to interrogate a multi-core fiber 1208 suitable for shape sensing. Light enters the core(s) of the optical fiber 1208 through the measurement arm(s) 1218 of the interferometric interrogator(s). Light backscattered in the optical sensing fiber 1208, coupled back into the measurement arm(s) 1218, and exiting the measurement arm(s) 1218 is then interfered with light that has traveled along and is exiting the reference arm(s) 1220 of the interferometric interrogator(s). One or more optical polarization beam splitters separate the resulting interference pattern(s) each into two orthogonal polarization components, which are measured by two detectors (e.g., photodiodes) of the acquisition unit 1210 (the two detectors collectively constituting a polarization-diverse optical detector). Each of the interferometric interrogators is being coupled to the tunable light source 1202 via optical couplers, and as the tunable light source 1202 is swept across a frequency range, the interference patterns from all channels are simultaneously measured by respective polarization-diverse optical detectors, and processed independently. The optical detectors measuring the interference pattern(s) generated in the interferometric interrogator network 1204, and additional detectors in the data acquisition unit 1210 for measuring light signals from the gas cell 1214 and interferometer 1216 of the laser monitor network 1206, convert the received light into electrical signals.

The computational processing unit 1212 can process the electrical signals resulting from the measured interference pattern for the two polarization states to determine, e.g., the strain in each fiber core as a function position along the fiber. In more detail, in some embodiments, the data acquisition unit 1210 uses the information from the laser monitor network 1206 to resample the detected interference pattern of the optical fiber 1208 to obtain samples at increments constant in optical frequency. Once resampled, the data is Fourier-transformed by the computational processing unit 1212 to produce a reflection signal in the temporal domain, corresponding to the amplitudes of the reflection signal as a function of time delay along the length of the optical fiber 1208. Using the distance that light travels in a given increment of time, this delay can be converted to a measure of length along the sensing fiber 1408. The sampling period determines the spatial resolution and is inversely proportional to the frequency range that the tunable light source 1202 was swept through during the measurement. As the optical fiber 1208 is strained, the local reflections shift in frequency and/or as the optical fiber 1208 changes in physical length. These distortions are highly repeatable. Hence, an OFDR measurement of reflected light for the optical fiber 1208 can be retained in memory to serve as a reference signal of the sensing fiber in an unstrained state. A subsequently measured reflection signal when the fiber 1208 is under strain may then be correlated with this reference signal by the computational processing system 1212, in accordance with the method described above, to determine the frequency shift as a function of location along the optical fiber 1208.

Figure 13:
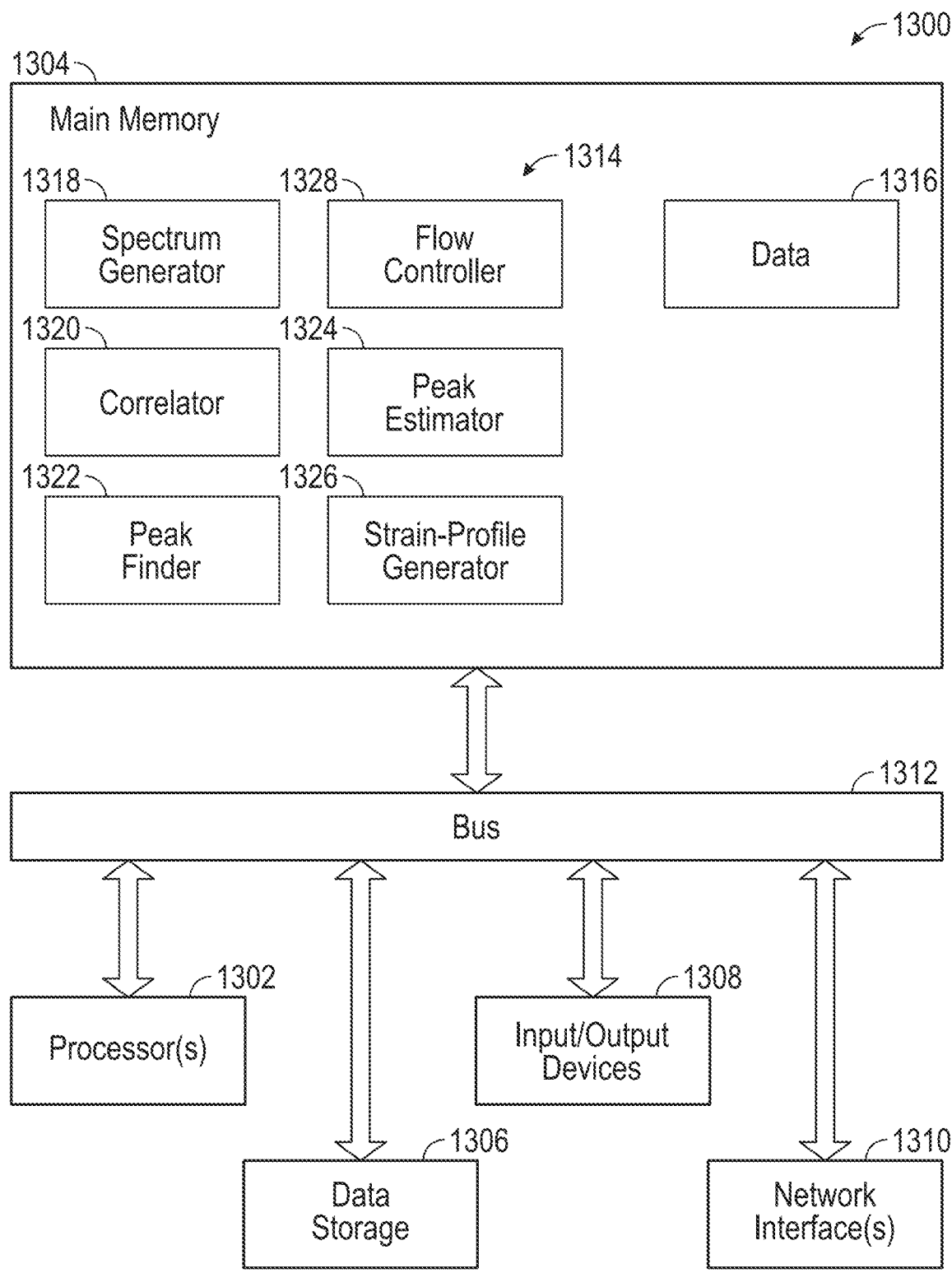
FIG. 13 is a block diagram of an example computing system for computing strain along an optical fiber with overlapping gratings based on correlations between measurement and reference signals, in accordance with various embodiments.

FIG. 13 is a block diagram of an example computing system 1500 for computing strain along an optical fiber with overlapping gratings based on correlations between measurement and reference signals (corresponding to acts 1106-1112 in FIG. 11), that is, a system implementing the computational functionality of the computational processing unit 1212. The system 1300 may be implemented by general-purpose computer hardware executing suitable software, although implementations with special-purpose hardware (or combinations of general-purpose and special-purpose hardware) are also conceivable. As shown, the system 1300 may include one or more processors 1302 (such as single-core or multi-core CPUs or graphics processing units (GPUs)), (volatile) main memory 1304 (e.g., random access memory (RAM)), non-removable and/or removable permanent data storage 1306 including one or more non-transitory machine-readable media and associated drives (e.g., hard disks, optical storage devices, etc.), input/output devices 1308 (e.g., keyboard, mouse, display device, printer, etc.), one or more network interfaces 1310, and one or more buses 1312 communicatively interconnecting the other system components. Although shown as a single device, the system 1300 may, alternatively, be implemented with multiple devices that communicate with each other via one or more wired or wireless networks, connecting to the network(s) via the network interfaces 1310.

To implement the computational functionality described above, suitable processor-executable software instructions 1314, and the data 1316 they operate on (e.g., measured reflection signals, reference spectra, results of computations) may be stored in the data storage 1306 and, during execution of the software, in the main memory 1304. As shown in more detail within the main memory 1304 (but also applicable to the data storage 1306), the instructions may be grouped into multiple software modules or components, each providing a distinct part of the overall functionality. For example, spectrum generator 1318 may process the raw data acquired in each measurement to compute a reflection signal as a function of time delay and frequency; correlator 1320 may compute the cross-correlation between any pair of spectra; peak finder 1322 may determine correlations maxima in a correlation signal, across frequency for a given time delay, or across both frequency and time delay; peak estimator 1324 may fit lines to correlation peaks across frequency determined at multiple discrete time delays, and extrapolate to the intersection of the lines to determine an approximate location of the correlation peak across time delay and frequency shift; strain-profile generator 1326 may compute strain along the fiber based on the correlation peaks; and flow controller 1328 may coordinate the operation of the other components, e.g., to instruct the correlator 1320 which spectra to correlate, to assemble the resulting one-dimensional correlations into a two-dimensional correlation signal, to determine the range of frequency shifts and time delays over which the search for the maximum is performed by the peak finder 1322, etc. Of course, the depicted organization into components is only one among many different possibilities.

As will be readily appreciated by one of ordinary skill in the art, the software components 1318-1328 (or some subset thereof, or different set of components providing some or all of their functionality) may be embodied on a non-transitory machine-readable medium whether integrated into a system such as the computing system 1300 or provided apart therefrom. The term "machine-readable medium" shall be taken to include any tangible medium that is capable of storing, encoding or carrying instructions for execution by a machine, or that is capable of storing or encoding data structures used by or associated with such instructions. The term "machine-readable medium" shall accordingly be taken to include, but not be limited to, solid-state memories and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks. All such machine-readable storage media are hardware devices suitable for storing data and/or instructions for a suitable period of time to enable use by the machine, and are therefore non-transitory.

While the disclosed subject matter has been described and explained herein with respect to various example embodiments, these examples are intended as illustrative only and not as limiting. Various modifications, additional combinations of features, and further applications of the described embodiments that do not depart from the scope of the subject matter may occur to those of ordinary skill in the art. Accordingly, the scope of the inventive subject matter is to be determined by the scope of the following claims and all additional claims supported by the present disclosure, and all equivalents of such claims.

What is claimed is:

1. A method for measuring an optical fiber, the optical fiber comprising a fiber core including at least two overlapping sets of gratings, the at least two overlapping sets of gratings having chirp rates that differ in direction or in magnitude or in both direction and magnitude, the method comprising:
    interrogating the fiber core by swept-wavelength interferometry to measure a time-domain reflection signal resulting from reflections off the at least two overlapping sets of gratings;
    converting the measured time-domain reflection signal into a plurality of measurement reflection spectra associated with different time delays;
    for each measurement reflection spectrum of the plurality of measurement reflection spectra: mapping the measurement reflection spectrum to a reference reflection spectrum of a plurality of reference reflection spectra and to an associated frequency shift between the measurement reflection spectrum and the reference reflection spectrum, whereby the associated frequency shift is associated with a unique location corresponding to the reference reflection spectrum; and
    determining, based on the associated frequency shifts, strain in the fiber core along the optical fiber.

2. The method of claim 1, further comprising:
for each measurement reflection spectrum of the plurality of measurement reflection spectra: correlating the measurement reflection spectrum with the plurality of reference reflection spectra over a range of time-delay shifts between the measurement reflection spectrum and the plurality of reference reflection spectra; wherein
mapping the measurement reflection spectrum is based on the correlating.

3. The method of claim 2, wherein the at least two overlapping sets of gratings comprise a first set of gratings and a second set of gratings, and wherein the mapping comprises:
estimating an estimated location of a correlation peak by extrapolation from pairs of correlation maxima across frequency at two or more time-delay shifts of the range of time-delay shifts, each pair of correlation maxima associated with a first grating of the first set of gratings and a second grating of the second set of gratings; and
determining a correlation peak across the range of time-delay shifts and across frequency by performing a search near the estimated location.

4. The method of claim 1, wherein:
the optical fiber comprises one or more additional fiber cores, each additional fiber core including at least two additional overlapping sets of additional gratings having chirp rates that differ in direction or in magnitude or in both direction and magnitude; and
the method further comprises determining strain in the one or more additional fiber cores along the optical fiber.

5. The method of claim 4, wherein
the fiber core and the one or more additional fiber cores together comprise a central core and at least three helical outer cores; and
the method further comprises: determining bend, twist, and axial strain along the optical fiber from the determined strains for the fiber core and the one or more additional fiber cores along the optical fiber.

6. The method of claim 5, further comprising: determining a three-dimensional position and orientation of the optical fiber from the determined bend, twist, and axial strain.

7. A strain measurement system comprising:
an optical fiber comprising a fiber core including at least two overlapping sets of gratings, the at least two overlapping sets of gratings having chirp rates that differ in direction or in magnitude or in both direction and magnitude;
a swept-wavelength interferometer system coupled to the fiber core and configured to measure a time-domain reflection signal resulting from reflections off the at least two overlapping sets of gratings; and
a computational processing unit configured to:
convert the measured time-domain reflection signal into a plurality of measurement reflection spectra associated with different time delays;
for each measurement reflection spectrum of the plurality of measurement reflection spectra: map the measurement reflection spectrum to a reference reflection spectrum of a plurality of reference reflection spectra and to an associated frequency shift between the measurement reflection spectrum and the reference reflection spectrum, whereby the associated frequency shift is associated with a unique location corresponding to the reference reflection spectrum; and
determine, based on the associated frequency shifts, strain in the fiber core along the optical fiber.

8. The system of claim 7, wherein the computational processing unit is configured to map the measurement reflection spectrum by, for each measurement reflection spectrum of the plurality of measurement reflection spectra:
assembling correlations of the measurement reflection spectrum with the plurality of reference reflection spectra into a correlation signal as a function of time-delay shift and frequency; and
determining a correlation peak in the correlation signal.

9. The system of claim 7, wherein the computational processing unit is configured to map the measurement reflection spectrum by, for each reference reflection spectrum of the plurality of reference reflection spectra:
assembling correlations of the plurality of measurement reflection spectra with the reference reflection spectrum into a correlation signal as a function of time-delay shift and frequency; and
determining a correlation peak in the correlation signal.

10. The system of claim 7, wherein the computational processing unit is further configured to:
correlate each measurement reflection spectrum with the plurality of reference reflection spectra over a range of time-delay shifts between the measurement reflection spectrum and the plurality of reference reflection spectra, wherein the computational processing unit is configured to map the measurement reflection spectrum based on the correlating.

11. The system of claim 10, wherein the computational processing unit is configured to map each measurement reflection spectrum to a reference reflection spectrum by:
estimating an estimated location of a correlation peak by extrapolation from pairs of correlation maxima across frequency at two or more time-delay shifts of the range of time-delay shifts, each pair of correlation maxima associated with a first grating of the first set of gratings and a second grating of the second set of gratings; and
determining the correlation peak across the range of time-delay shifts and across frequency by performing a search near the estimated location.

12. The system of claim 10, wherein, for each measurement reflection spectrum of the plurality of measurement reflection spectra, the range of time-delay shifts is a symmetric range covering, at a specified resolution, time-delay shifts up to an expected maximum time-delay shift in both directions from zero time-delay shift between measurement reflection spectrum and reference reflection spectrum.

13. The system of claim 7, wherein the computational processing unit is configured to convert the measured time-domain reflection signal into a plurality of measurement reflection spectra associated with different time delays by:
processing the measured time-domain reflection signal by short-time Fourier transform.

14. The system of claim 7, wherein:
the optical fiber comprises one or more additional fiber cores, each additional fiber core including at least two additional overlapping sets of additional gratings having chirp rates that differ in direction or in magnitude or in both direction and magnitude; and
the computational processing unit is further configured to determine strain in the additional fiber cores along the optical fiber.

15. The system of claim 14, wherein
the fiber core and the one or more additional fiber cores together comprise a central core and at least three helical outer cores; and
the computational processing unit is further configured to:
determine bend, twist, and axial strain along the optical fiber from the determined strain for the fiber core and the one or more additional fiber cores along the optical fiber.

16. The system of claim 15, wherein the computational processing unit is further configured to determine a three-dimensional position and orientation of the optical fiber from the determined bend, twist, and axial strain.

17. An optical fiber comprising:
a fiber core comprising:
a first set of gratings comprising one or more chirped gratings extending over a section of the fiber, and
a second set of gratings comprising one or more gratings extending over the section of the fiber such that the first and second sets of gratings overlap, the one or more gratings of the second set of gratings differing in direction, or in magnitude, or in both direction and magnitude, from the one or more chirped gratings of the first set of gratings.

18. The optical fiber of claim 17, wherein the one or more gratings of the second set of gratings are chirped in an opposite direction to the one or more chirped gratings of the first set of gratings.

19. The optical fiber of claim 17, wherein the one or more gratings of the second set of gratings comprise a single-frequency grating.

20. The optical fiber of claim 17, wherein the optical fiber comprises at least one additional fiber core, wherein each additional fiber core comprises:
a first additional set of gratings comprising one or more additional chirped gratings extending over the section of the fiber, and
a second additional set of gratings comprising one or more additional gratings extending over the section of the fiber such that the first and second additional sets of gratings overlap, the one or more additional gratings of the second additional set of gratings differing in direction, or in magnitude, or in both direction and magnitude, from the one or more additional chirped gratings of the first additional set of gratings.

* * * * *

UNITED STATES PATENT AND TRADEMARK OFFICE
CERTIFICATE OF CORRECTION

| | | |
|---|---|---|
| PATENT NO. | : 11,815,371 B2 | Page 1 of 1 |
| APPLICATION NO. | : 17/877526 | |
| DATED | : November 14, 2023 | |
| INVENTOR(S) | : Froggatt et al. | |

It is certified that error appears in the above-identified patent and that said Letters Patent is hereby corrected as shown below:

On the Title Page

On page 2, in Column 1, under Item (56) "Foreign Patent Documents", Line 4, delete "100785046-81" and insert --100785046 B1-- therefor Signed and Sealed this
Nineteenth Day of December, 2023

*Katherine Kelly Vidal*

Katherine Kelly Vidal
*Director of the United States Patent and Trademark Office*